(12) United States Patent
Kamata

(10) Patent No.: US 8,644,110 B2
(45) Date of Patent: Feb. 4, 2014

(54) METHODS AND SYSTEMS FOR SPURIOUS CANCELLATION IN SEISMIC SIGNAL DETECTION

(75) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 297 days.

(21) Appl. No.: 13/111,955

(22) Filed: May 20, 2011

(65) Prior Publication Data
US 2012/0294116 A1 Nov. 22, 2012

(51) Int. Cl.
G01V 1/00 (2006.01)
G01V 13/00 (2006.01)
H04B 15/00 (2006.01)

(52) U.S. Cl.
USPC ............... 367/43; 381/94.5; 367/38; 367/44; 367/45; 367/46; 73/1.85

(58) Field of Classification Search
USPC ......... 367/43, 21, 38, 44, 4, 907, 59, 60, 901; 702/17; 181/122
See application file for complete search history.

(56) References Cited

U.S. PATENT DOCUMENTS

| 3,699,325 | A | 10/1972 | Montgomery et al. | |
|---|---|---|---|---|
| 4,210,968 | A | 7/1980 | Lindseth | |
| 6,253,156 | B1 | 6/2001 | Bui-Tran | |
| 7,225,662 | B2 | 6/2007 | Kamata | |
| 8,270,634 | B2 * | 9/2012 | Harney et al. | 381/94.5 |
| 2002/0179364 | A1 * | 12/2002 | Bussear et al. | 181/108 |
| 2006/0042352 | A1 | 3/2006 | Kamata | |
| 2008/0253226 | A1 * | 10/2008 | Tenghamn et al. | 367/21 |
| 2010/0133010 | A1 * | 6/2010 | Blias | 175/50 |

OTHER PUBLICATIONS

Sercel, Geophones-Hydrophones, Ahead of Curve, ftp://ftp.geophys.washington.edu/pub/seis_net/SMO/Sercel/GeophonesHydrophones.pdf, Jan. 18, 2008(on web site but published on Dec. 2005).*
International Search Report for the equivalent PCT patent application No. PCT/US2012/038468 issued on Dec. 3, 2012.

* cited by examiner

Primary Examiner — Isam Alsomiri
Assistant Examiner — Hovhannes Baghdasaryan
(74) Attorney, Agent, or Firm — Matthias Abrell

(57) ABSTRACT

Methods and systems utilizing seismic sensors configured or designed for use in seismic signal detection are provided so as to reduce the occurrence of spurious responses of the sensors. A method of seismic surveying using a seismic sensor may include the steps of deploying the seismic sensor at a location for seismic signal detection and acquiring seismic signals. The seismic signals may include high frequency response signals containing spurious response signals at an identifiable bandwith. The method may further include applying spurious response cancellation based on the bandwidth location of the spurious response signals and generating modified seismic waveforms having extended frequency bandwidth.

18 Claims, 39 Drawing Sheets

Spurious frequency exist at about 20xf0 to 30xf0.

Fc = 100Hz, 3rd order filters

METHODS AND SYSTEMS FOR SPURIOUS CANCELLATION IN SEISMIC SIGNAL DETECTION

BACKGROUND

Some embodiments of the present disclosure relate to devices for sensing vibrations in earth formations. More specifically, embodiments of the present disclosure are directed to detecting seismic signals utilizing electrodynamic sensing devices, such as geophones and seismometers. These electrodynamic sensing devices are configured or designed for the cancellation of spurious frequency responses in the detection of high frequency seismic signals thereby facilitating the generation of seismic waveforms having expanded frequency range. Of course, practitioners of skill in the art will recognize that embodiments of the present disclosure may be applicable to other types of vibration transducers, for example, used either in sensing or transmitting operations.

In the oil and gas industry seismic sensors are deployed at various locations, such as on the earth surface, in the sea, at the seabed, or in a borehole, to aid in the determination of operationally significant subsurface structural and formation property information by measuring seismic signals reflected from changes in these subsurface formations. In this, seismic sensors are commonly used for purposes of obtaining useful data relating to acoustic impedance contrasts in subsurface structures. In certain applications, such as hydraulic fracture monitoring, cross-well tomography, seismic operations (among other applications not expressly listed), seismic sensors are used to acquire high frequency seismic data.

In seismic signal detection, the vibrations in the earth resulting from a source of seismic energy are sensed at discrete locations by sensors. The output from these sensors is then used to determine the structure of the underground formations or to understand source mechanisms of the acoustic events caused in the target rocks. The source of seismic energy can be natural, such as earthquakes and other tectonic activity, subsidence, volcanic activity or the like, or man-made such as acoustic signals from surface or underground operations, or from deliberate operation of seismic sources at the surface or underground. For example, the sensed seismic signals may be direct signals that are derived from micro-seismicity induced by fracturing or reservoir collapse or alteration, or reflected signals that are derived from an artificial source of energy.

Sensors generally fall into two main categories; hydrophones which sense the pressure field resulting from a seismic source, or geophones which sense the particle velocity field in the surrounding media arising from a seismic source.

Geophone seismic sensors are widely used to detect seismic waves. When the earth moves due to the seismic energy propagating either directly from the source or via an underground reflector, the geophone, which can be located at the earth's surface, in the sea or at the seabed, or on the wall of a borehole which penetrates the earth (among other examples), moves with the motion of the surrounding media caused by acoustic wave propagation. A geophone may be designed to detect very small seismic signals, for example, in the order of $10^{-8}$ m/s. The typical electrical noise floor is less than 1 micro volt rms. To observe and detect small seismic signals, it is desirable that the seismic sensor have a relatively high sensitivity in combination with a low noise level.

As depicted in FIG. 1A, a typical geophone 10 has one or more detecting systems, such as cylindrical moving coils 12 and magnets 15. The geophone 10 may also include a housing 14 and end caps 18. These moving coils 12 may be suspended by springs 20 so as to be disposed around a magnet 15 having pole pieces 16.

Each moving coil 12 is maintained at a neutral, rest position by the springs 20, and is free to oscillate in a magnetic field of the magnet 15 from a centered position thereof. Springs 20 are usually made from sheet metal designed to maintain the coil 12 at a centered, equilibrium position relative to the magnetic field of the magnet 15. For example, in a geophone that is designed for vertical operation, the springs 20 are pre-stressed to centralize the moving coil 12 in the magnetic field against gravitational acceleration. The pair of springs and the moving mass of the coil operates as a spring-mass system.

As depicted in FIG. 1A, the moving coil 12 is suspended in a magnetic flux field and generates electrical signals that are proportional to the velocity of the moving coil 12 relative to the magnetic field. These electrical signals also correspond to the movement of the ground (media) surrounding the geophone. When the coil 12 moves in the magnetic field, a voltage is induced in the coil that can be output as a signal. The output signal is linear to the velocity of the ground movement above the natural frequency defined by the spring-mass system.

FIG. 1B is a schematic depiction of a response mechanism of a geophone seismic sensor in which $x_0$ is the neutral position of the moving coil, x is the position of the coil in motion and $\xi$ is the relative displacement of the coil against the center of the magnetic field. If the axis of the geophone is aligned with the direction of motion, the moving coil mounted on the spring inside the geophone substantially stays in the same position, resulting in the relative motion of the coil with respect to the housing.

At frequencies above the natural frequency of the spring-mass system, the spring is functionally invisible and the coil generally stays in the same position while the housing moves relative to the coil. At very low frequencies, the housing and the coil substantially move together and the geophone does not output any significant signals. At the natural frequency, the spring-mass system creates resonance. The shunt resistor attached to the geophone controls this resonance by allowing current to flow into the coil and inhibiting the movement of the coil. By adjusting the amount of shunt, the spring-mass system is typically critically damped.

The amplitude and phase responses of the output of a geophone with a shunt resistance as shown in FIG. 1B are:

$$\text{Amplitude} = \frac{a\omega S \left(\frac{\omega}{\omega_0}\right)^2}{\sqrt{\left(1 - \frac{\omega^2}{\omega_0^2}\right)^2 + \left(2D\frac{\omega}{\omega_0}\right)^2}} \qquad \text{Equation 1}$$

$$\text{Phase} = \tan^{-1}\left(\frac{2D\frac{\omega}{\omega_0}}{1 - \frac{\omega^2}{\omega_0^2}}\right) \qquad \text{Equation 2}$$

where:

$$D = D_0 + \frac{S_0^2}{2m\omega_0(r + R_s)} \qquad \text{Equation 3}$$

$$S = S_0 \frac{R_s}{r + R_s} \qquad \text{Equation 4}$$

$\omega$ [1/s]: Angular frequency f=2πω
$\omega_0$ [1/s]: Angular natural frequency $f_0$=2πω$_0$
$D_0$ [-]: Open circuit damping
D [-]: Total damping $S_0$ [V/(m/s)]: Open circuit sensitivity
r [ohm]: Coil resistance
m [g]: Moving mass
$R_s$ [ohm]: Shunt resistance FIG. 1C shows exemplary amplitude and phase responses of a geophone based on the parameters shown below by using Equations 1, 2 and 3.
Parameters
$f_0$ [Hz]=20
$D_0$ [-]=0.36
$S_0$ [V/(m/s)]=79
r [ohm]=1500
m [g]3.14
$R_S$ [ohm]=21734
D [-]=0.7

In seismicity monitoring, it is also desirable to minimize or eliminate spurious responses that may be output by a geophone when sensing seismic signals. As schematically illustrated in FIGS. 2A-2C, such undesirable spurious responses may be due to a rocking or cross-axial movement of the moving coil within the geophone. The spurious responses may interfere with the normal sensing of ground movement by the geophone.

For example, the geophone springs are primarily designed to provide freedom of movement of the moving coil in an axial direction, as shown in FIG. 2A. Although the springs restrict or inhibit radial movement of the coil, in some cases, radial movement of the coil will occur. As shown in FIG. 2B, high frequency resonant responses may be caused when the central axis of the moving coil is laterally displaced from the axis defining the axial movement of FIG. 2A at the center of the geophone. In other cases as shown in FIG. 2C, the moving coil may also move in a rotational mode about an axis perpendicular to the axis defining the axial movement of FIG. 2A.

In particular, spurious responses may be present at the high frequencies that are detected by a seismic sensor (see the note in FIG. 2D). The appearance of a spurious response is dependent on the type and configuration of geophone being used. Referring generally to FIG. 2E, this graph shows two examples of spurious responses varying in frequency and amplitude. For a particular design of a geophone, the spurious response may be in a very narrow frequency band.

FIG. 2D shows exemplary spurious response signals in seismic waveforms detected by a geophone seismic sensor. The spurious response frequency may generally be about 20 to 30 times the natural frequency. Geophone manufacturers typically design their geophones so that the spurious responses are extended to above and outside of the seismic frequencies of interest. However, spurious responses may slightly change the amplitude and frequency of the detected waveforms depending on the orientation of the geophone and the angle of the incident waves. For example, if a geophone is tilted, the moving coil is displaced from the center of the housing due to the gravitational acceleration (note again FIG. 2B). As discussed above with reference to FIGS. 2A-2C, since the springs of the seismic sensor are stiff in relation to lateral movement of the moving coil, the frequency is high and damping is small, i.e., a high Q. Spurious responses appear as a ringing response of sinusoidal waves triggered by the first motion. As a result of these types of situations, problems due to spurious responses are known in wideband seismic waveform detection and recording.

In seismic data acquisition, the useful frequency range is generally from the natural frequency of the geophone to the spurious response. As mentioned above, the spurious response is typically located beyond the useful seismic frequency signals for a particular geophone seismic sensor due to the manufacturer's design. For example, typical seismic signals that are detected in land seismic operations involve a 5 to 70 Hz bandwidth, and usually no useful energy is present beyond 100 Hz, because 1) the seismic source does not generate higher frequencies; 2) the frequency attenuation is high at higher frequencies; and 3) anti-aliasing filters are used to mask the spurious responses.

However, in certain applications and seismic operations, such as shallow seismic surveys, operations that use high frequency sources, shallow VSP work, hydraulic fracture mapping or cross-well tomography, the seismic signals of interest include frequencies even beyond 1000 Hz. For example, in particular in hydraulic fracture mapping, in which the seismic events caused by the fracturing of rocks are detected and recorded, the size of the fracture(s) may be estimated by analyzing the high frequency contents of the recorded waveforms.

Furthermore, in applications such as cross-well tomography, seismic signals are generated by a downhole source that is deployed in a well, and the signals are detected by seismic receivers that are deployed in an adjacent well. Since the distance between source(s) and receivers is not far, the attenuation of high frequencies is small and it is possible to detect and record high frequency content in the seismic waveforms.

Therefore, it would be desirable to provide seismic sensor systems that are designed to minimize or eliminate spurious response signals, for example, in the detection of wideband seismic waveforms. Of course, applications of embodiments of the present disclosure are not limited to this exemplary desire.

Another interest is in the signals in low frequencies. If there is an interest to detect a low frequency event lower than the natural frequency of a geophone, the amplitude of the signal is very small and may be submerged or overwhelmed by the electronic noise. For example, a natural earthquake can contain signals below 1 Hz (called sub hertz). To detect such low frequency information, it is desirable to build a low frequency geophone (possibly called a seismometer). If a 1 Hz geophone is built, the spurious frequency may be around 20 Hz. This would fall within the frequency range of interest.

The limitations of conventional seismic sensor designs noted in the preceding are not intended to be exhaustive but rather are among many which may reduce the effectiveness of previously known sensor mechanisms. The above should be sufficient, however, to demonstrate that sensor structures existing in the past will admit to worthwhile improvement.

SUMMARY OF THE DISCLOSURE

Embodiments disclosed herein provide methods and systems for seismic sensors, such as geophones and seismometers. In particular, some embodiments of the present disclosure provide methods and systems having seismic sensor systems that reduce or eliminate spurious responses. In some embodiments disclosed herein, seismic sensor outputs from a low frequency sensor and a high frequency sensor are combined to reduce spurious responses in seismic waveform data, as illustrated in FIG. 3. In other embodiments disclosed herein, the seismic sensors of the present disclosure provide enhancement in signal-to-noise ratios (SNR) at the overlapped frequency range by deriving a mean of the low and high frequency signals.

The applicant recognized that in certain instances it is possible to decrease the spurious frequency responses by optimizing spring design. However, it is not possible to eliminate all spurious responses via the design of the geophone mechanical components. The present disclosure in some aspects provides methods and systems for spurious cancellation by notch filtering techniques that are applied to reduce or eliminate spurious response in recorded waveform data.

The applicant further recognized that it is possible to use the concept of a network system to cancel spurious responses in a seismic sensor system. For example, in a loud speaker system, which radiates sound signals that are proportional to the input electrical signals in a limited frequency range, the lower frequency is determined by the natural frequency of the speaker system and higher frequency limit is just below the frequency of the first partial mode of vibration of the diaphragm or cone of the speaker(s). If the area of the cone is small, the partial mode of vibration is at a high frequency; however, the efficiency to generate low frequency signals is small. Therefore, several separate speakers are typically combined to generate acoustic power in a wide frequency range, such as a network speaker system known as a Three-Way Speaker that is designed to split the frequencies for three different sizes of speakers, i.e., a woofer, a midrange, and a tweeter.

Applicant has recognized that it is possible to utilize a multi-way configuration having a network design in the seismic sensor systems of the present disclosure to cancel spurious geophone responses. In certain embodiments of the present disclosure, multiple geophones with different spurious responses are utilized to detect seismic waves at the same location. Geophone responses in different frequency bands are combined and the seismic signals are reconstructed with extended spurious responses (as conceptualized in FIGS. 4A-H).

The applicant recognized that using notch filtering techniques and/or a multi-way system in designing seismic sensor systems would eliminate many of the shortcomings and problems that exist in seismic sensor systems of the past. The applicant has herein proposed various ways to configure or arrange geophone sensing systems based on notch filtering and multi-way system technology for utilization with seismic sensors for various applications.

Additional advantages and novel features will be set forth in the description which follows or may be learned by those skilled in the art through reading the materials herein or practicing the principles described herein. Some of the advantages described herein may be achieved through the means recited in the attached claims.

THE DRAWINGS

The accompanying drawings illustrate certain embodiments and are a part of the specification. Together with the following description, the drawings demonstrate and explain some of the principles of various embodiments of the present invention.

Figure 9A:
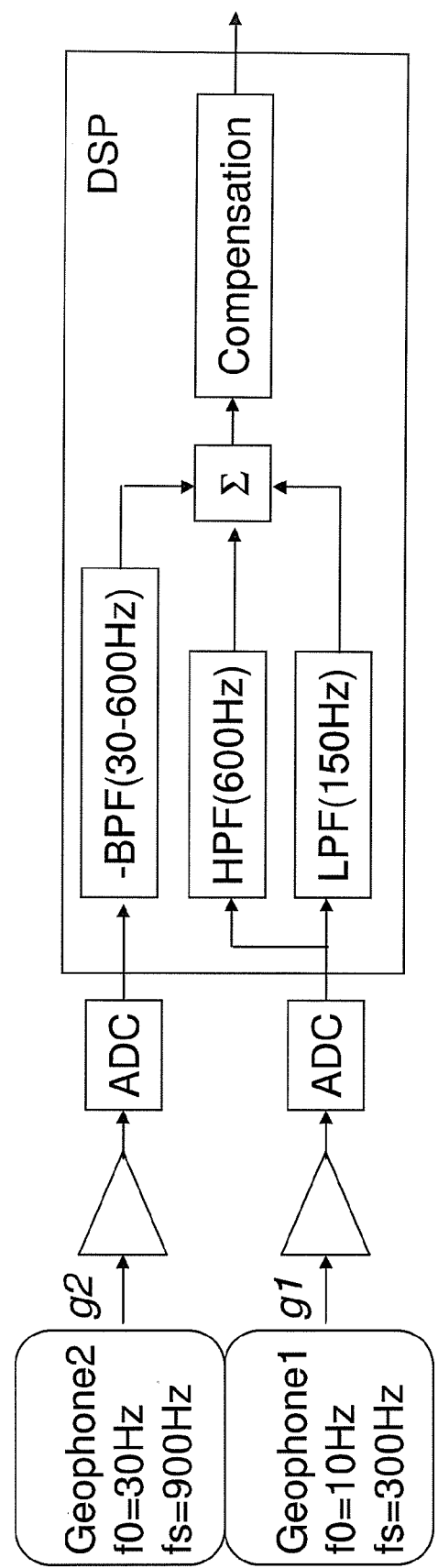
FIG. 9A is an exemplary block diagram representation of an embodiment of the possible combination of two geophones configured so as to produce results similar to those shown in FIG. 8, according to some aspects of the present disclosure.
Figure 9B:
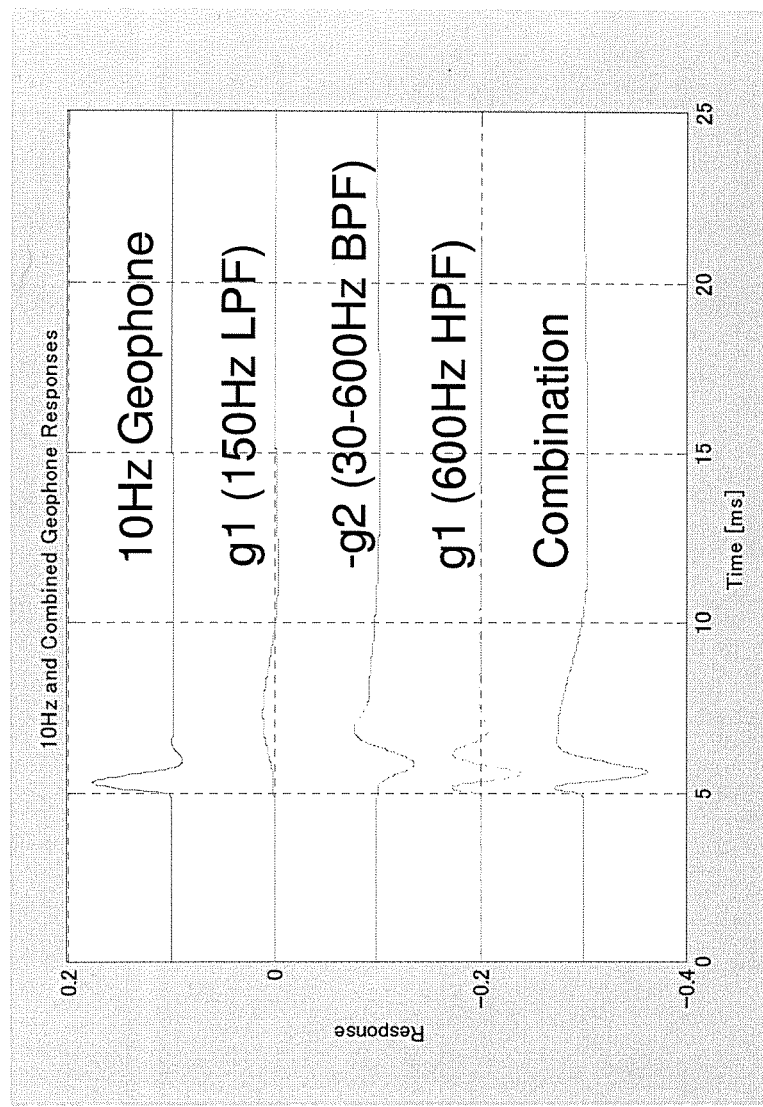
FIG. 9B shows an input seismic waveform detected with a 10 Hz geophone (at top), and response signals output by a low pass filter, a high pass filter, and a band pass filter, and combined seismic waveform, produced by an embodiment configured similar to the one shown in FIG. 9A, according to some aspects of the present disclosure.
Figure 9C:
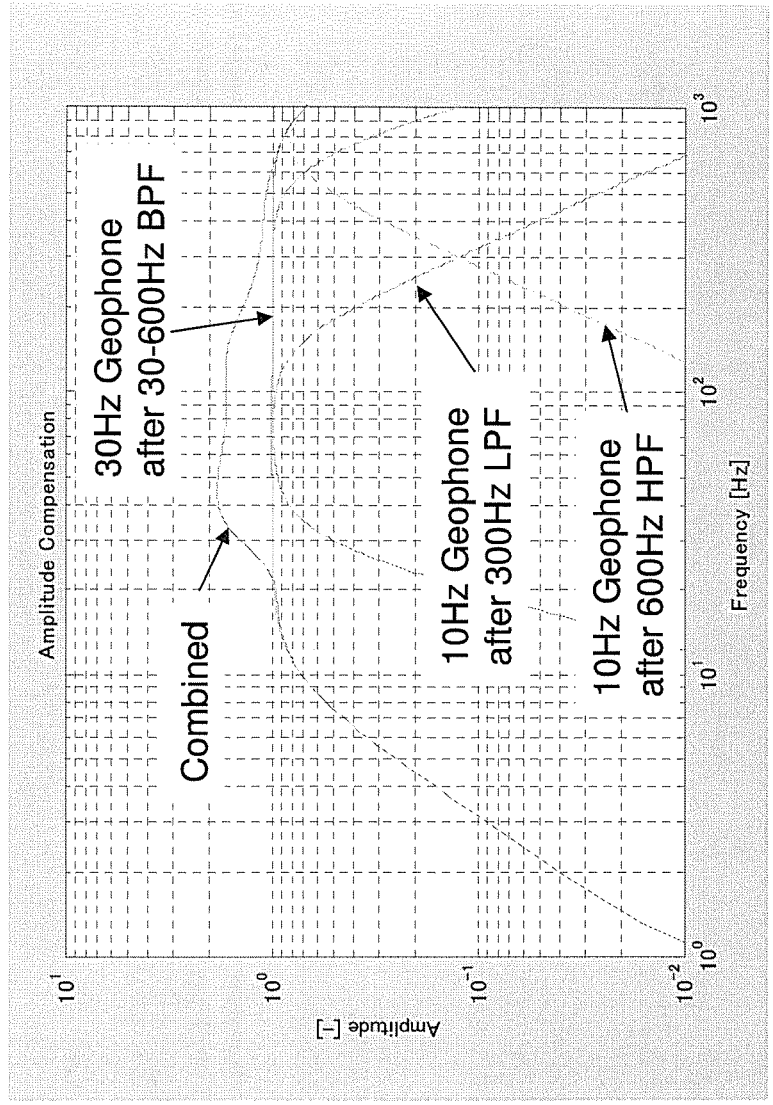
FIG. 9C shows a graphical representation of the amplitude spectra of the response signals depicted in FIG. 9B.
Figure 9D:
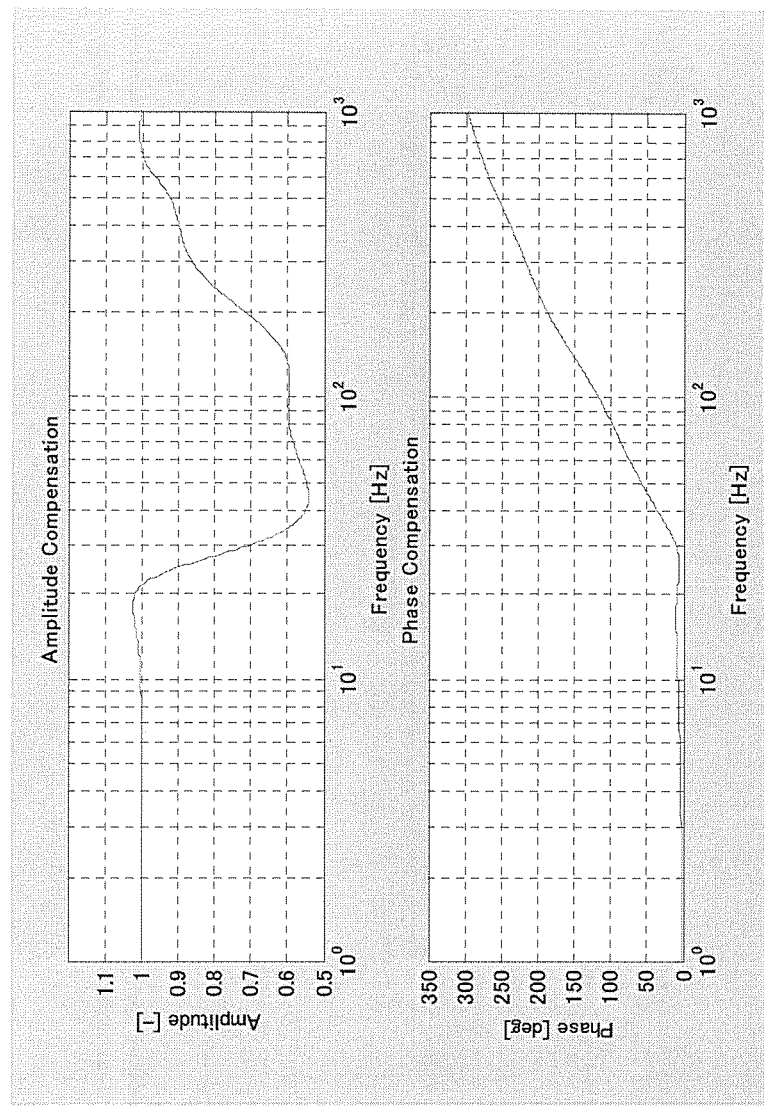
Figure 10:
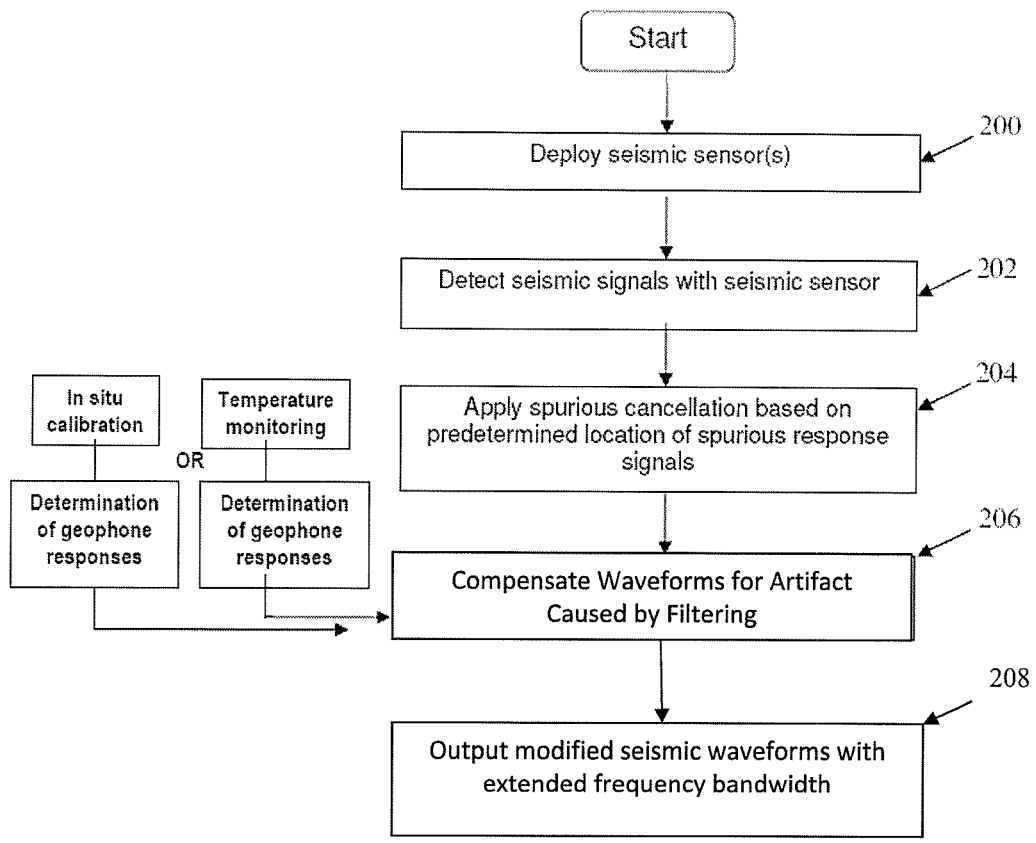

FIG. 9D depicts graphical representation of the modeled results of amplitude and phase compensation using a compensation filter to transform the combined signal of the embodiment shown in FIG. 9A to that of a 10 Hz geophone according to some aspects of the present disclosure; and FIG. 10 depicts a flowchart representation of an embodiment of a method for spurious cancellation in accordance with some aspects of the present disclosure.

Throughout the drawings, identical reference numbers and descriptions indicate similar, but not necessarily identical elements. While the principles described herein are susceptible to various modifications and alternative forms, specific embodiments have been shown by way of example in the drawings and will be described in detail herein. However, it should be understood that the various embodiments of the invention are not intended to be limited to the particular forms disclosed. Rather, potential embodiments of the invention include all modifications, equivalents and alternatives falling within the scope of the appended claims.

DETAILED DESCRIPTION

Illustrative embodiments and aspects of the invention are described below. It will of course be appreciated that in the development of any such actual embodiment, numerous implementation-specific decisions must be made to achieve the developers' specific goals, such as compliance with system-related and business-related constraints that will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment of this invention.

Turning now to the drawings, wherein like numerals indicate like parts, and with regard to conciseness and brevity, the disclosure herein may be focused on the illustrative concept of the various techniques that may be utilized for electrodynamic type sensors, such as a geophone or a seismometer. In some applications, these electrodynamic type sensors may be utilized in the field of seismic prospecting, or of active or passive monitoring of underground reservoirs, or be deployed in exploration and/or production wells that are deviated in relation to the vertical direction, for example. The sensors may also comprise multi-component geophones configured to detect components of signals that are received along three orthogonal axes. In some cases, embodiments of sensor systems according to the present disclosure may be utilized in wireline systems, land seismic surveying systems, seabed seismic surveying systems, hydraulic fracture monitoring, production logging, and permanent or other monitoring systems, including systems for monitoring earthquakes or micro-seismicity in a reservoir, among others.

As described in greater detail below, the present disclosure provides various techniques which may be used to facilitate and improve seismic signal detection, in particular, high frequency geophone responses in wide bandwidth seismic waveform data, among other applications.

Figure 1A:
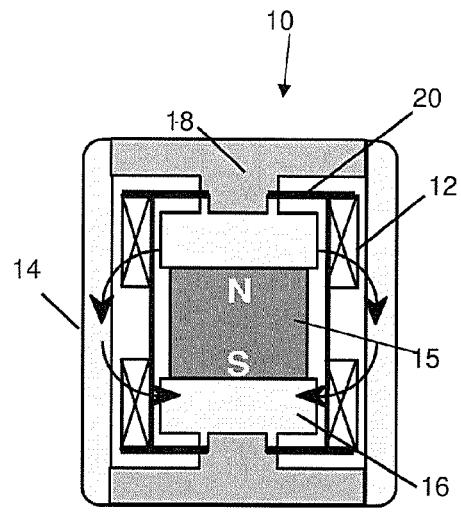
FIG. 1A is a schematic view of a conventional geophone seismic sensor.
Figure 1B:
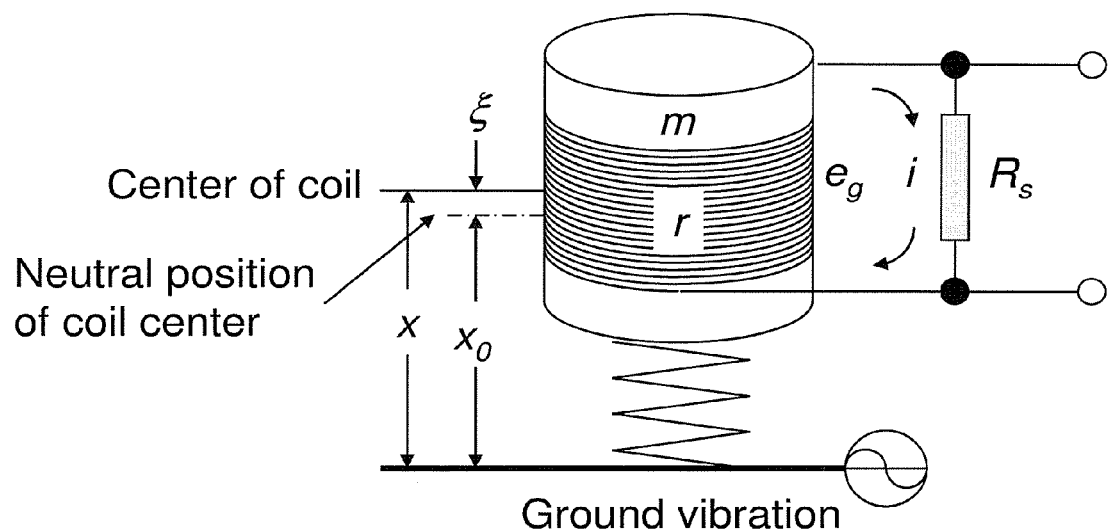
FIG. 1B is a schematic depiction of a response mechanism of a conventional geophone seismic sensor provided to explain principles discussed herein.
Figure 1C:
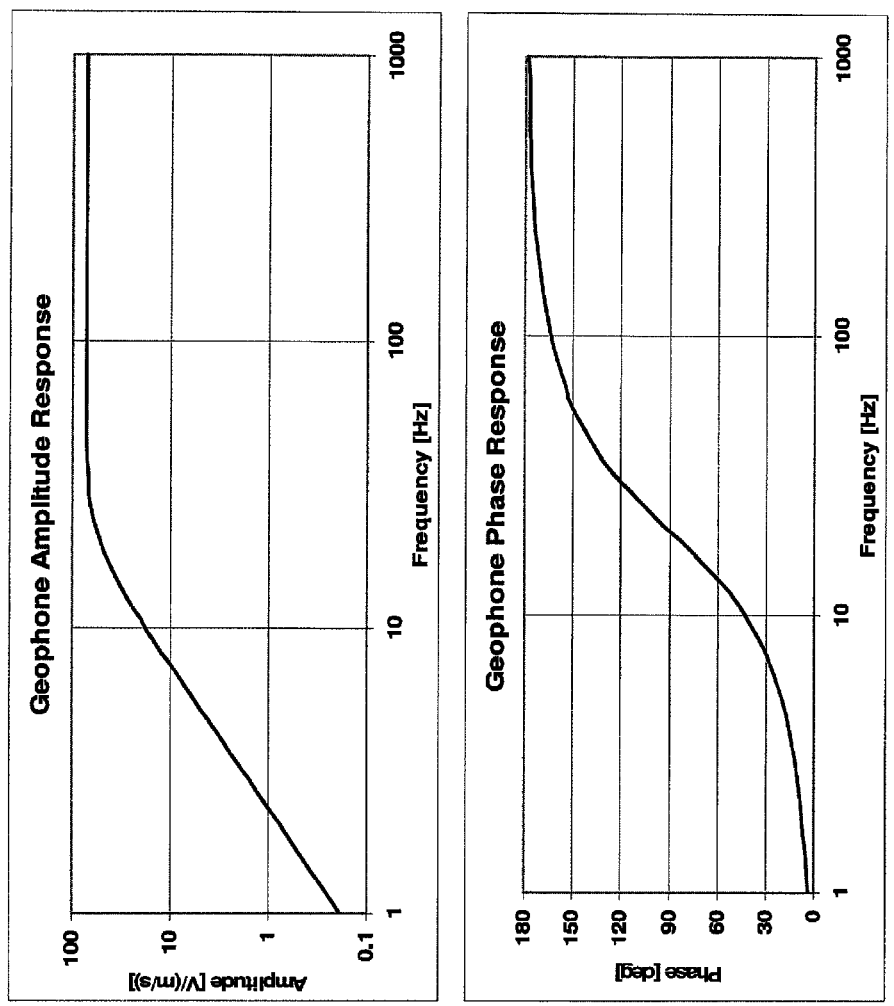
FIG. 1C shows exemplary amplitude and phase responses of a geophone seismic sensor.
Figure 2A:
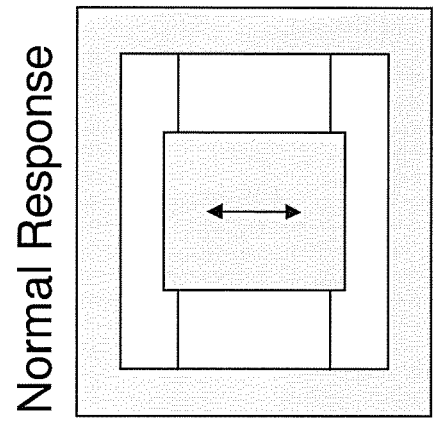
FIGS. 2A-2C depict schematically exemplary geophone responses to ground motion including spurious responses.
Figure 2B:
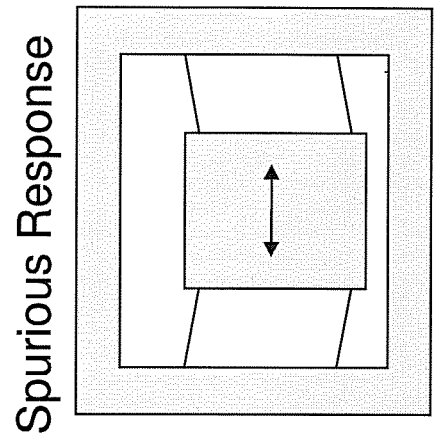
Figure 2C:
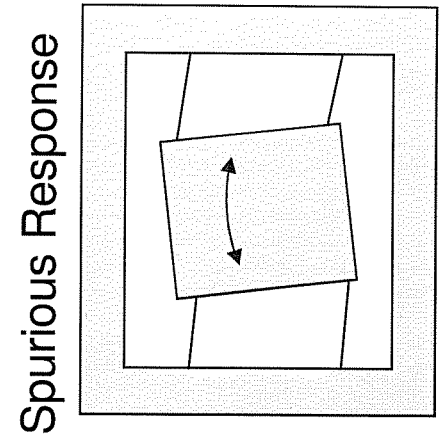
Figure 2D:
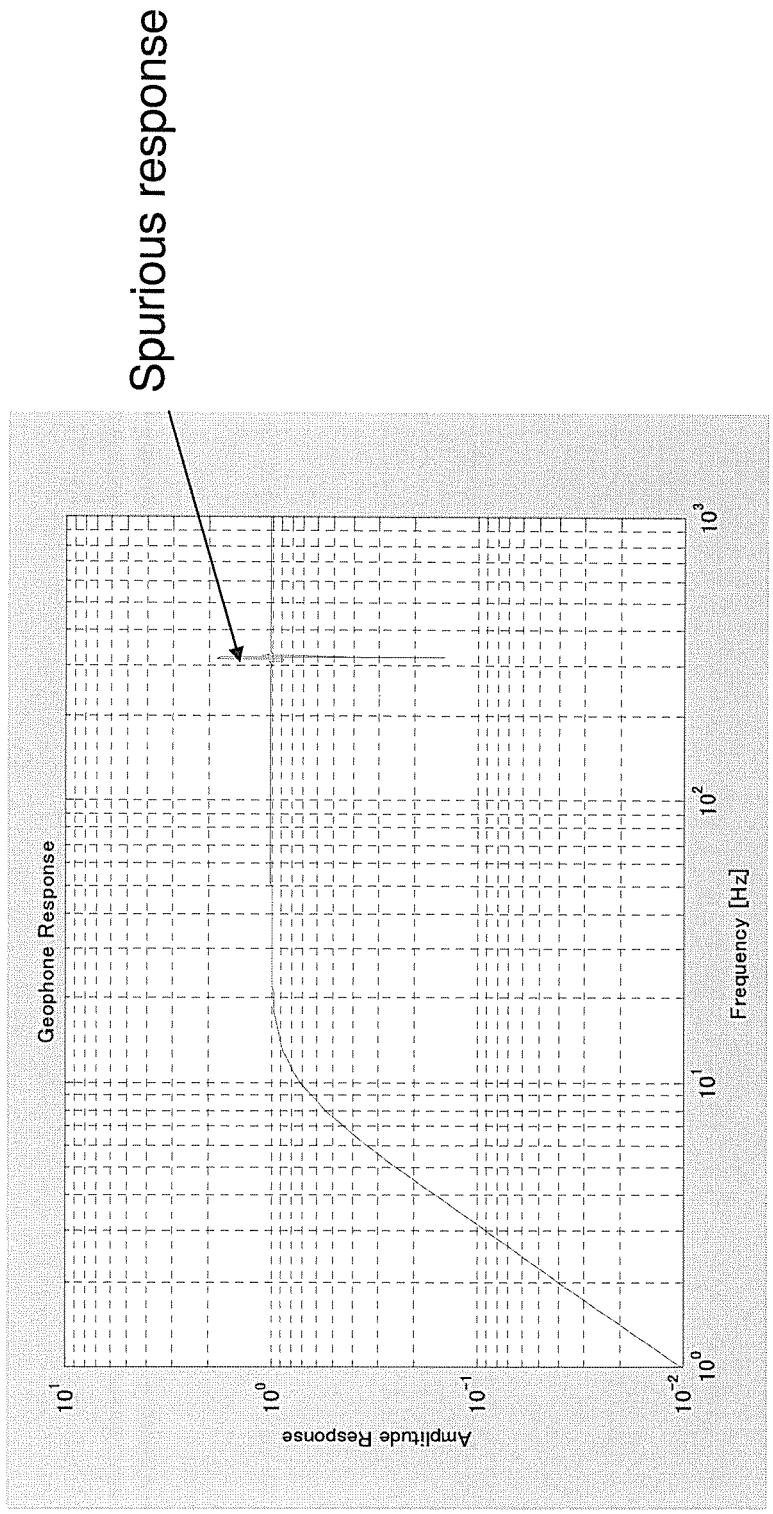
FIG. 2D depicts a spurious frequency response of a geophone seismic sensor.
Figure 2E:
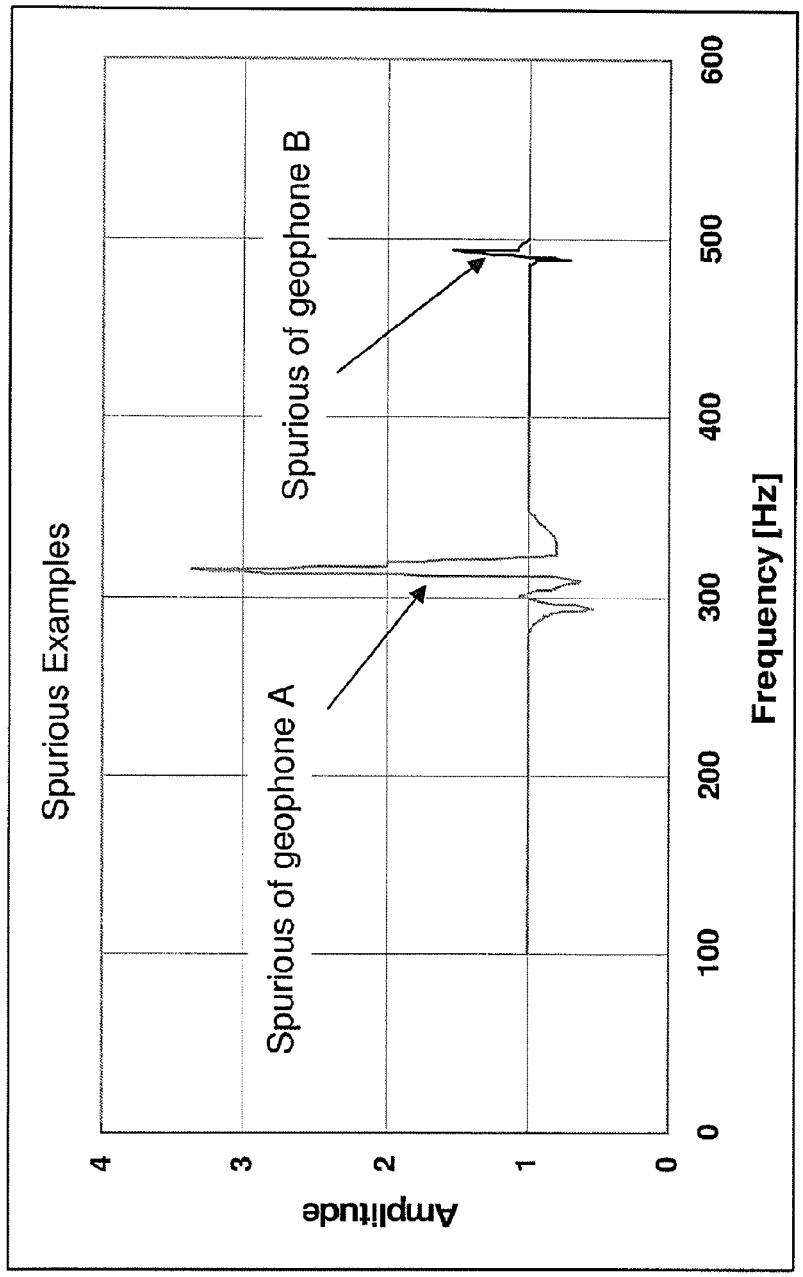
FIG. 2E shows measured spurious response signals of two geophones, Geophone A and Geophone B.
Figure 3:
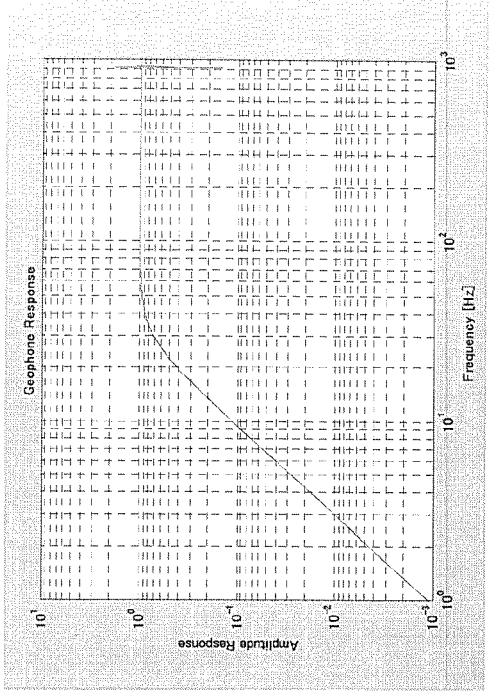
FIG. 3 shows an exemplary combination of geophone responses in different frequency bands and reconstructed geophone response signals with extended spurious responses according to one possible embodiment of the present disclosure.
Figure 3:
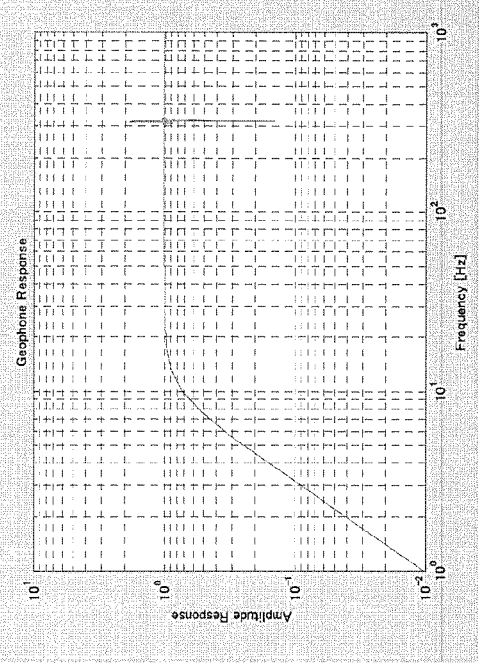
Figure 3:
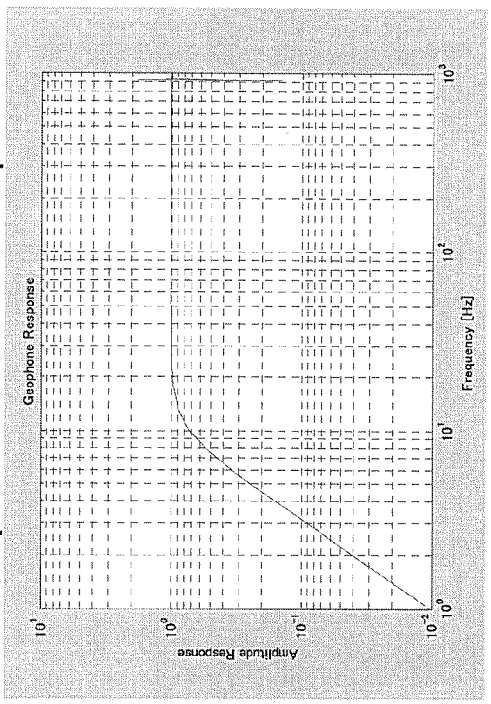

As used in this application, the term "geophone" is intended to include, for example, conventional-type geophones such as that illustrated in FIG. 1A, and very low frequency geophones such as seismometer type electrodynamic sensors, as well as geophone accelerometer (GAC) devices from Schlumberger Corporation which, for example, may be configured or designed to measure relatively wider acceleration ranges than conventional-type geophones.

As previously discussed above, some embodiments of the present disclosure propose systems that may overcome some of the shortcomings identified in conventional geophones of the type described above. Embodiments of the present disclosure provide various techniques to remove spurious response signals by, for example, applying notch filtering. In some instances, missing frequencies may result. However, notch filtering is effective in removing spurious response signals that are present in a relatively small (i.e., narrow) bandwidth.

Embodiments of the present disclosure further propose systems and techniques for combining geophone response signals such that spurious response signals are suppressed or inhibited. For example, various techniques are disclosed herein for notch filtering spurious response signals and then summing the notched signals. In some embodiments of the present disclosure, network geophone sensor systems are disclosed for combining geophone response signals with suppression of spurious responses.

As discussed in further detail below, notch filtering techniques may be utilized in combination with geophone seismic sensors having, for example, narrow bandwidth spurious frequency responses. In other aspects of the present disclosure, geophone outputs from low frequency and high frequency geophones are combined so that spurious responses are minimized. Embodiments of the present disclosure also include geophone network designs based on the principles herein. Further, applicant has recognized that some network arrangements may cause disturbances at crossover frequencies as a result of the phase response differences between the low frequency and high frequency geophones. Embodiments of the present disclosure may contain a solution. Moreover, embodiments of the present disclosure propose SNR enhancement at overlapped frequencies by deriving a mean of the low and high frequency signals.

Figure 4A:
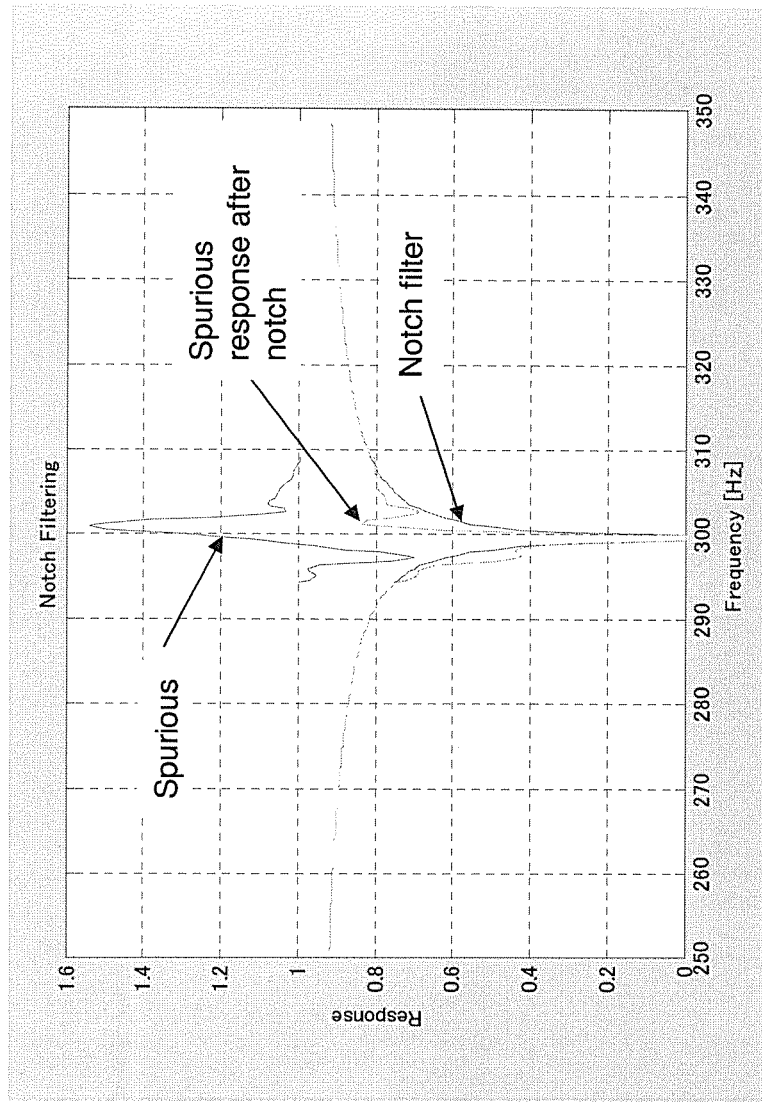
FIG. 4A shows suppression of a spurious response by applying a notch filter to a measured exemplary spurious response.

By utilizing aspects of the principles described herein, applicant designed techniques for spurious response cancellation by using notch filtering. Since spurious response typically is in a narrow frequency range, applicant recognized that it would be an effective solution to apply notch filtering techniques to suppress spurious responses so that the seismic information of interest is not lost. FIG. 4A shows an exemplary suppression of spurious response by a notch filter applied to an exemplary measured spurious response signal.

Figure 4B:
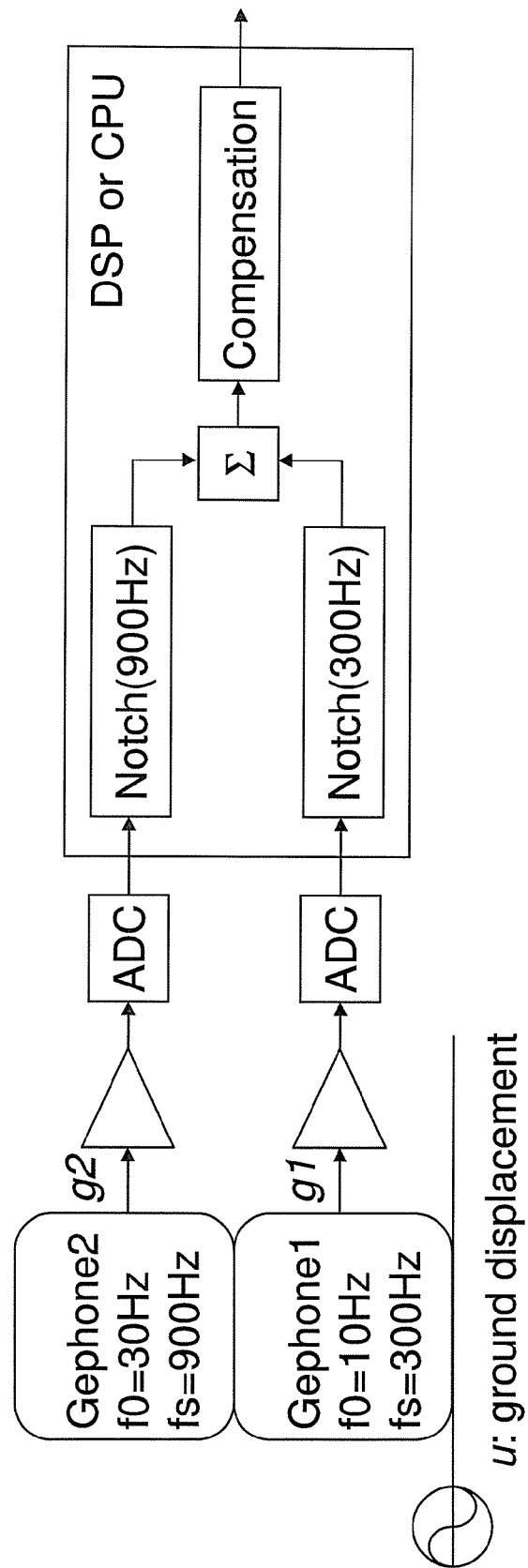
FIG. 4B shows one exemplary block diagram for the summation of seismic signals from two geophones after spurious responses are notched.

Referring generally to FIG. 4B, this drawing represents an exemplary block diagram of an embodiment of a system for the summation of seismic signals from two geophones, Geophone 1 and Geophone 2, after spurious response signals are notched. In this example, Geophone 1 is a 10 Hz geophone with a spurious response at 300 Hz and Geophone 2 is a 30 Hz geophone with a spurious response at 900 Hz. In order to add the respective response signals, the signals may be digitized individually.

It should be noted that a combination of a 10 Hz and a 30 Hz geophone are used throughout to illustrate various embodiments of the present disclosure. However, this is just in order to simplify the detailed description and is merely an example of an illustrative combination. Other combinations are, considered to be within the scope of the disclosure and should be apparent to a person of skill in the art after review of the present disclosure application of the teachings herein. Depending upon the application and desired range of the combined geophones, various combinations of frequencies and numbers of geophones may be considered. As another example, a combination of a 1 Hz geophone and a 10 Hz geophone may be used for low frequency applications.

Returning to the previous illustrative description, the geophone response signals may be digitally filtered and combined. A band-pass-filter (BPF) may be applied to the 30 Hz geophone so as to suppress noise below the frequency where Geophone 2 has less seismic energy. Moreover, the polarity of the Geophone 2 signals output from the BPF may be flipped so as to enhance the response. However, a simple summation of the filtered response signals of Geophone 1 and Geophone 2 reduces the amplitude due to phase rotation.

It is not necessary that Geophone 1 and Geophone 2 respectively be 10 Hz and 30 Hz geophones, rather any suitable geophones may be utilized based on the particular requirements for the seismic acquisition. However, as evident from the principles described herein, the spurious response frequencies of the two geophones that are selected should be different from one another.

Figure 4C:
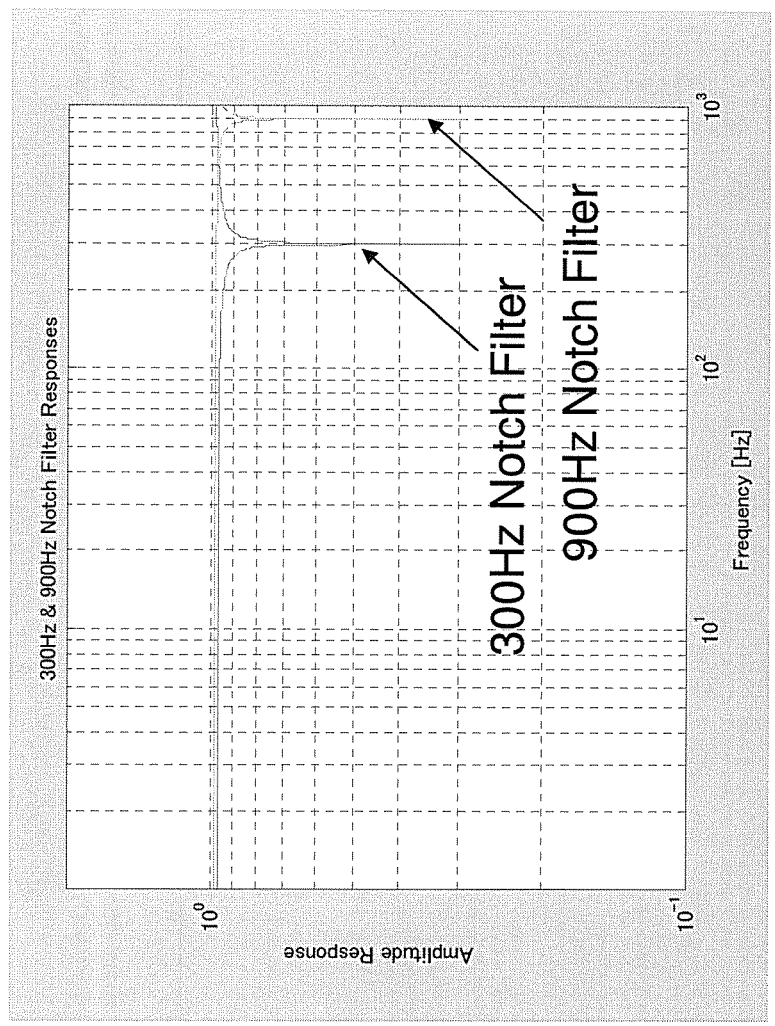
FIG. 4C shows two notch filters that were designed for Geophone 1 and Geophone 2 of FIG. 4B.

Applicant designed two notch filters for Geophone 1 and Geophone 2 in the frequency domain, as shown in FIG. 4C. As evident from FIG. 4C, the spurious response is notched out by the notch filters.

Figures 4D, 4E:
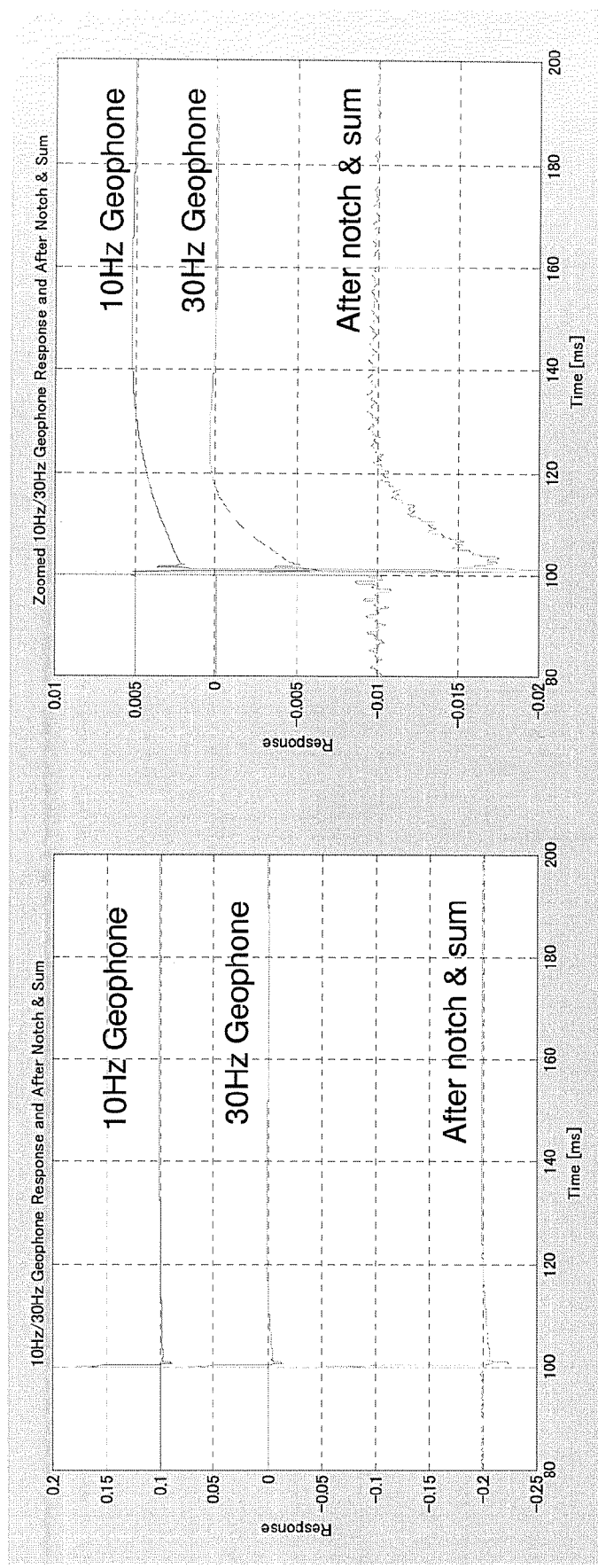
FIG. 4D shows responses of two geophones to an impulse input signal of 1-1000 Hz and the summed response after notch filtering is applied.
FIG. 4E is an enlarged view of a selected portion of FIG. 4D.

FIG. 4D shows the impulse responses of the two geophones, and the summed response after notch filtering is applied. For this simulation, the frequency range of the input signal was chosen to be between 1 Hz and 1000 Hz in view of a high frequency seismic acquisition, such as in cross-well seismic operations. In other situations, a more conventional seismic frequency range is from 5 Hz to 100 Hz. It may be noted that the resulting artifacts of the notch filters (such as phase rotation for example) may be small when compared to other methods that are described in alternative embodiments of the present disclosure.

The graphical representations of FIG. 4E provide the same responses as FIG. 4D, but with selected areas magnified due to the difficultly in seeing the resulting artifacts of the geophone response over the very wide frequency range of FIG. 4D. In FIG. 4E, it may be seen that removing the 300 Hz and 900 Hz spurious responses cause a combined ringing responses. However, it is evident that the resulting artifacts of notch filtering may be relatively small.

Figure 4F:
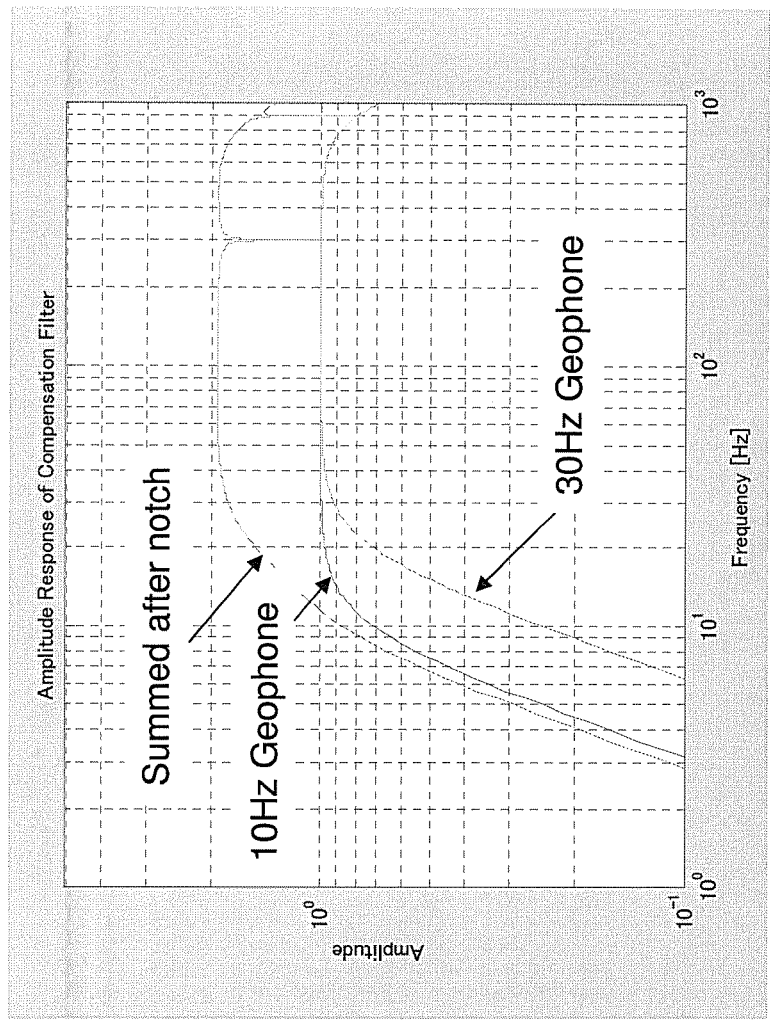
FIG. 4F shows the amplitude response of the summed signals shown in FIGS. 4D and 4E compared with the response signals of a 10 Hz geophone and a 30 Hz geophone.

FIG. 4F depicts the graphical representations of the amplitude response of the summed signals in comparison to those of the 10 Hz geophone and the 30 Hz geophone, after the spurious responses are notched.

Since the geophone responses are known, and the filter responses are also known by design, it is possible to design a compensation filter. Let $T_{g1}$ and $T_{g2}$ respectively be the transfer functions of Geophone 1 and Geophone 2. The outputs of Geophone 1 and Geophone 2 are notch filtered by transfer functions of $T_{n1}$ and $T_{n2}$. The transfer functions of the signals before summing are:

$$T_1 = T_{g1} \cdot T_{n1}$$

$$T_2 = T_{g2} \cdot T_{n2} \qquad \text{Equation 5}$$

The total transfer function $T_t$ from the ground velocity and combined geophone output is then:

$$T_1 = T_{g1} \cdot T_{n1} + T_{g2} \cdot T_{n2} \qquad \text{Equation 6}$$

The transfer function to transform the combined geophone response to the response of Geophone 1, which is a 10 Hz geophone, is then:

$$T_c = \frac{T_{g1}}{T_{g1} \cdot T_{n1} + T_{g2} \cdot T_{n2}} \qquad \text{Equation 7}$$

The geophone transfer functions can be made by using Equations 1 and 2 with the appropriate geophone parameters.

Figure 4G:
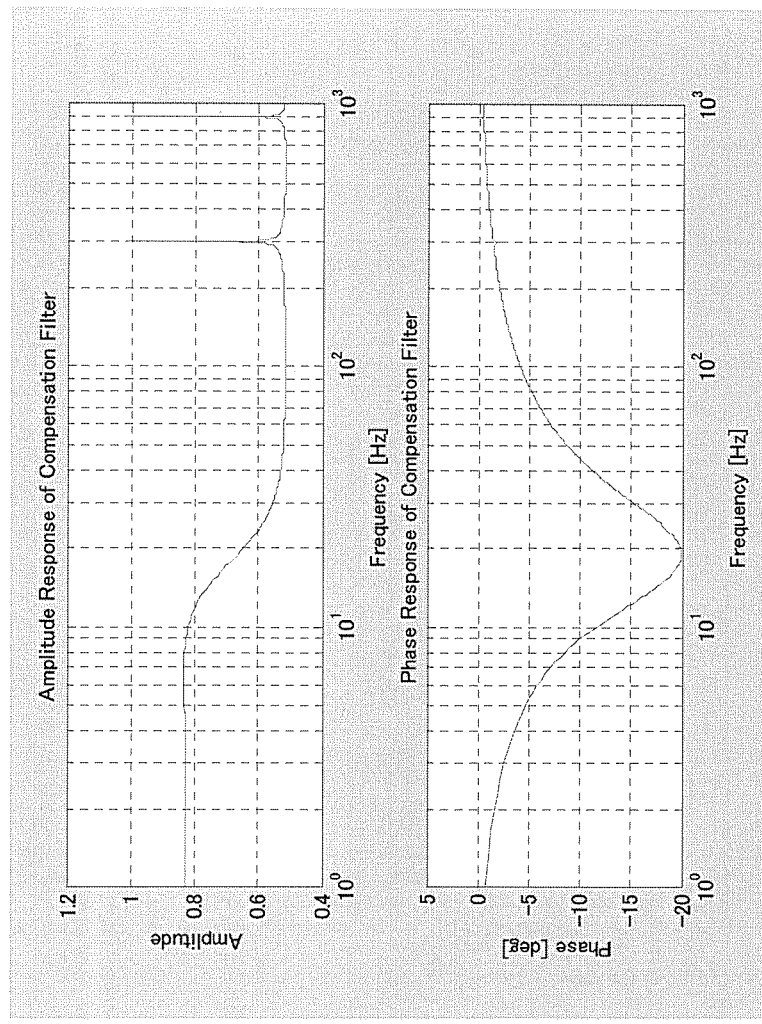
FIG. 4G depicts the results of amplitude and phase compensation using a compensation filter for summed geophone response signals according to the present disclosure.

FIG. 4G shows a graphical representation of the results of using a compensation filter for the summed geophone signals based on Equation 7 with the responses of the notch filters. However, it is noted that it may be difficult to design an analog filter for the response shown in FIG. 4G. In this, the compensation also may be applied in digital signal processing as:

$$s_c = \text{real}[IFFT\{FFT(s_s) \cdot T_c\}] \quad \text{Equation 8}$$

where $s_s$ is the output of combined geophone signal and $s_c$ is the compensated signal.

Figure 4H:
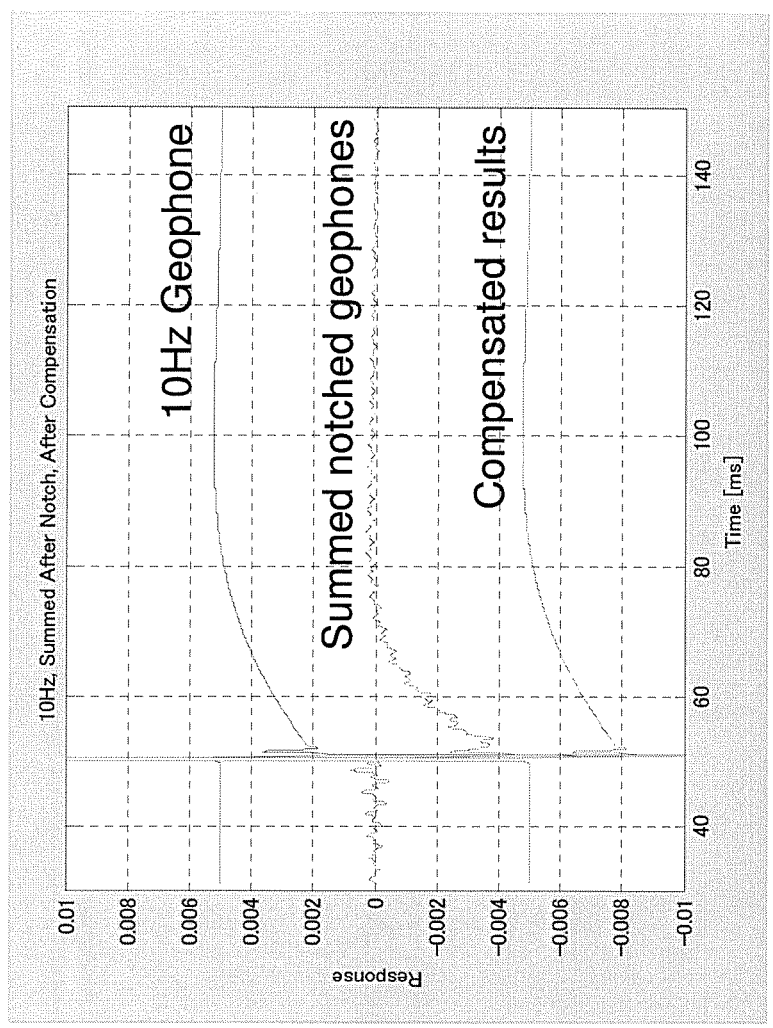
FIG. 4H shows the results of the summed trace after application of a compensation filter.

FIG. 4H shows the graphical results of a summed trace after the compensation filter is applied. It is seen that the original 10 Hz geophone response may be obtained after spurious response signals are notched and the compensation filter is applied.

Figure 5A:
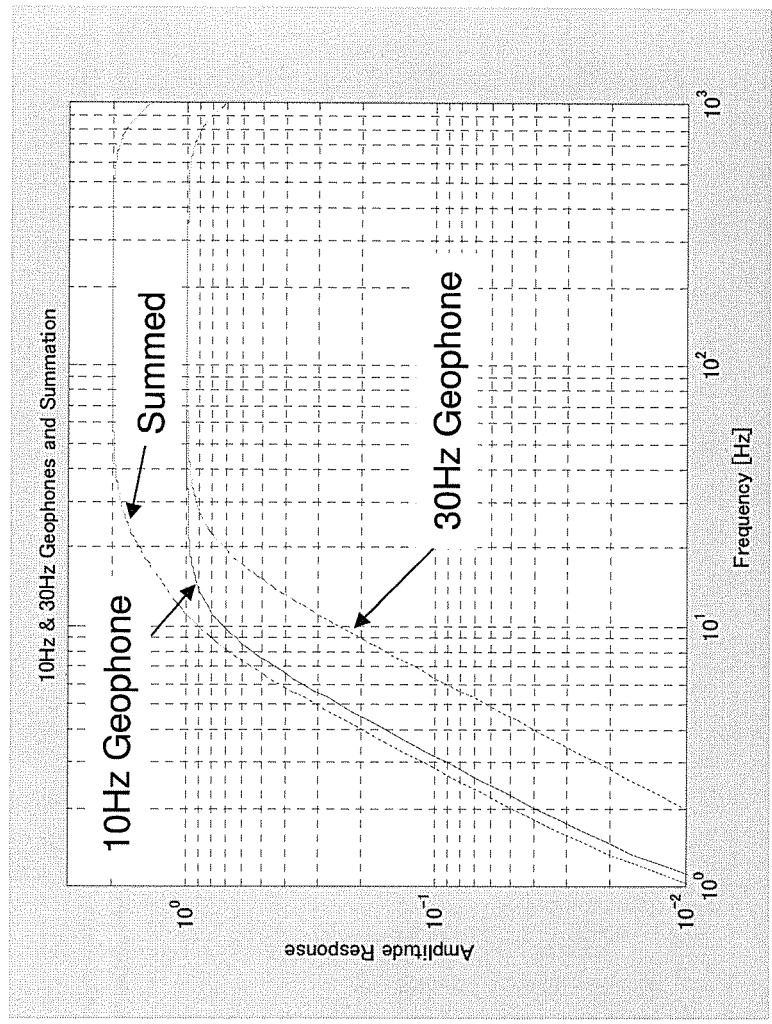
FIG. 5A shows a summation of a 10 Hz geophone seismic sensor and a 30 Hz geophone seismic sensor with an input signal of 1-1000 Hz.

A brief description is now provided of certain principles relating to the summation of the geophone response signals. FIG. 5A shows a graphical representation of the summation of a 10 Hz geophone seismic sensor and a 30 Hz geophone seismic sensor with an input signal range of 1-1000 Hz. The sensitivities of the two geophones are the same. However, the amplitude after summation is doubled at frequencies above 30 Hz.

Figure 5B:
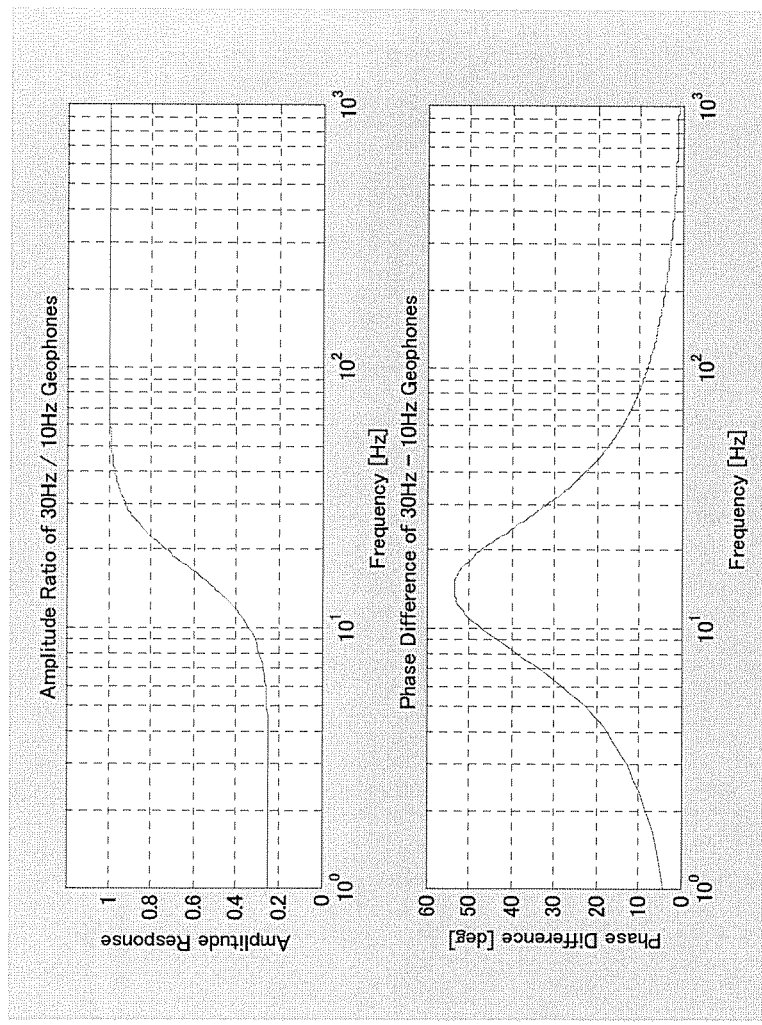
FIG. 5B shows the amplitude ratio (top) and phase difference (bottom) between a 30 Hz geophone and a 10 Hz geophone.

In general, a summation of two signals improves the Signal-to-Noise Ratio (SNR). FIG. 5B shows a graphical representation of the amplitude ratio (top) and phase difference (bottom) between a 30 Hz geophone and a 10 Hz geophone. The amplitude ratio gradually reduces below 30 Hz and approaches a relatively constant number, about 0.25 for this case. The phase difference goes through a maximum at 15 Hz and is about 53 degrees.

Since the 30 Hz geophone does not provide significant signal data below 30 Hz, the addition of such 30 Hz geophone signals to the 10 Hz geophone signals below 30 Hz adds more noise than signals. Since there is a 53 degree phase difference at 15 Hz, the 30 Hz geophone signals may not be efficiently added to the 10 Hz geophone signals around this 15 Hz frequency. Accordingly, in order to optimize the SNR for the summation of signals, the phases of the two geophone signals are selected so as to be the same, and the geophone signals are not added in the frequency range where there is a lack of significant signal data.

If the resistances of the moving coils of the geophones are the same, and the same electric circuits are used, the electrical noises have the same amplitudes, but are random. Then the noise level increases by a factor of $\sqrt{2}$ at any frequency. Above 30 Hz, the signal strength may be doubled by adding two geophone signals. The improvement of the SNR is:

$$\Delta SNR = \frac{\Delta \text{Signal}}{\Delta \text{Noise}} = \frac{2}{\sqrt{2}} = \sqrt{2} \quad \text{Equation 9}$$

As previously mentioned, since a 30 Hz geophone provides fewer response signal data below 30 Hz, adding the signal data of a 30 Hz geophone below 30 Hz is essentially the same as adding noise instead of useful data. In order not to add noise below 30 Hz, the 30 Hz geophone response signals may be filtered using a suitable filter to reduce the noise effect below 30 Hz.

Furthermore, to match the phase to maximize summing signals, the 30 Hz geophone signals may be transformed to 10 Hz geophone signals using Equation 10 below by knowing the transfer functions of the 10 Hz and 30 Hz geophones, $T_{g1}$ and $T_{g2}$.

$$g_T = \text{real}\left[IFFT\left\{FFT(g_2) \cdot \frac{T_{g1}}{T_{g2}}\right\}\right] \quad \text{Equation 10}$$

This transformation process, however, boosts noise below 30 Hz. So as not to add noise below 30 Hz, a HPF may be applied. The HPF selected may be a zero phase or linear phase filter so as not to rotate the phase for signal summation. In the case of a linear phase filter, the same delay is applied to the 10 Hz geophone signals.

Figure 5C:
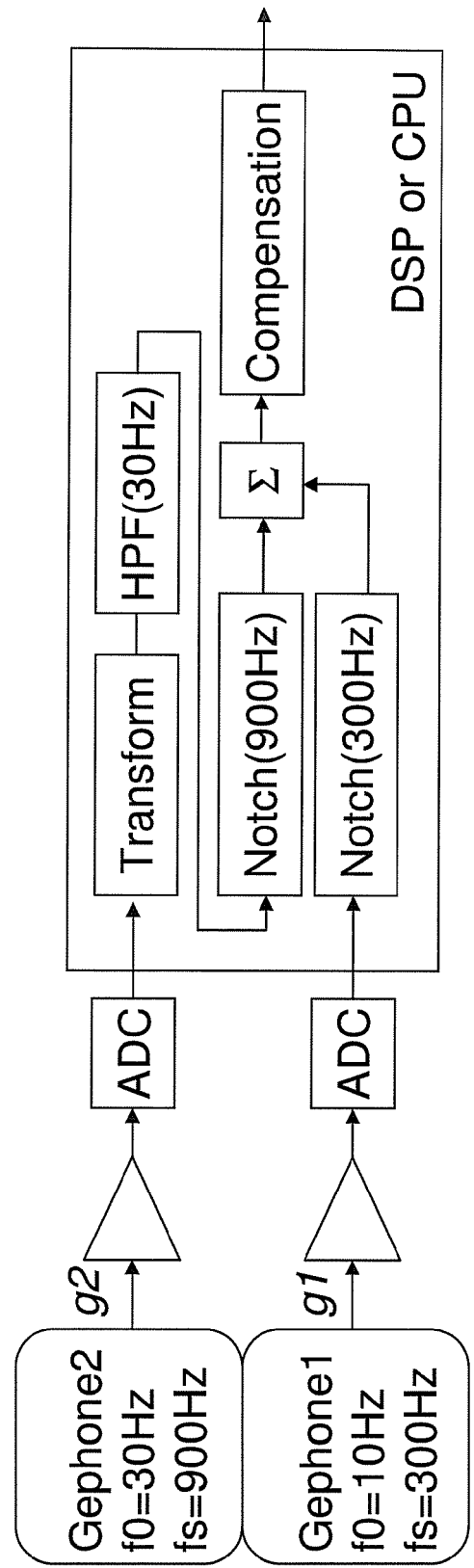
FIG. 5C shows in an exemplary block diagram one possible system for implementing signal conditioning for reducing spurious response signals while not adding the low frequency noise of a 30 Hz geophone according to the present disclosure.

FIG. 5C shows a block diagram of an illustrative embodiment of a system for implementing signal conditioning for the reduction of spurious response signals in a geophone sensor system. A zero or linear phase filter may be designed in a Finite Impulse Response (FIR) manner. However, it is not practical to make a zero or linear phase FIR HPF because a long filter length is required. In this simulation, a second order 20 Hz Infinite Impulse Response (IIR) filter is applied twice, forward and backward to make a zero-phase filter. The cut off frequency should be determined by the actual noise level and the natural frequencies of the two geophones for optimal SNR qualities.

Figure 5D:
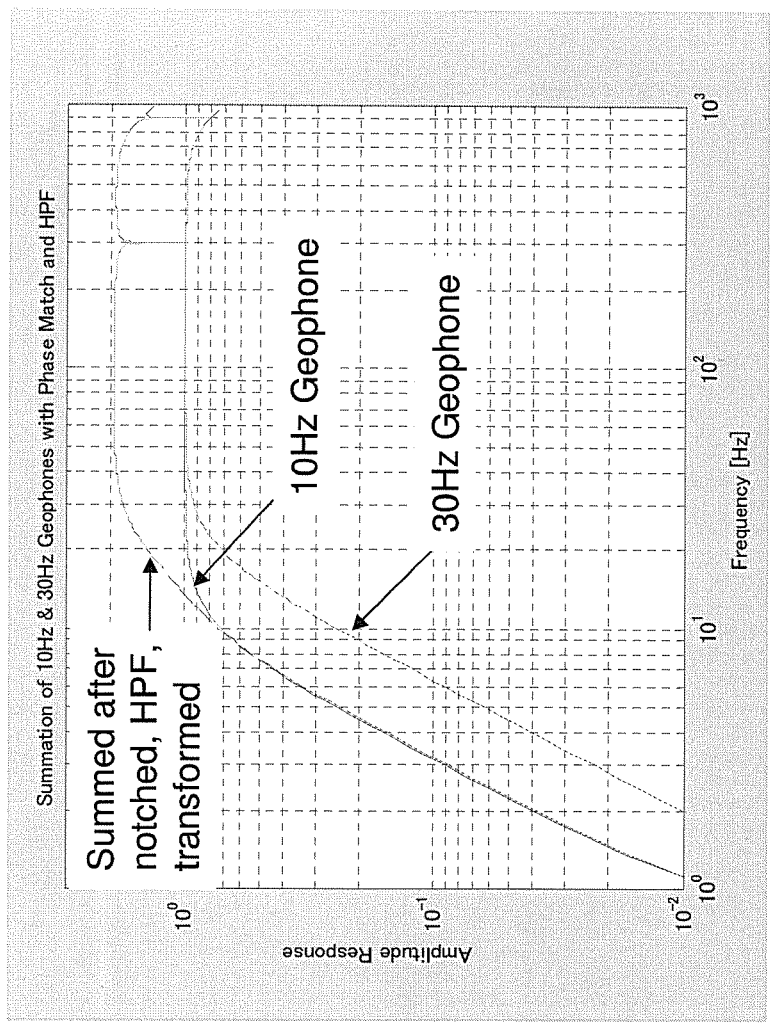
FIG. 5D shows amplitude spectra of summed results of 10 Hz geophone and 30 Hz geophone signals according to an embodiment of the block diagram shown in FIG. 5C.
Figure 5E:
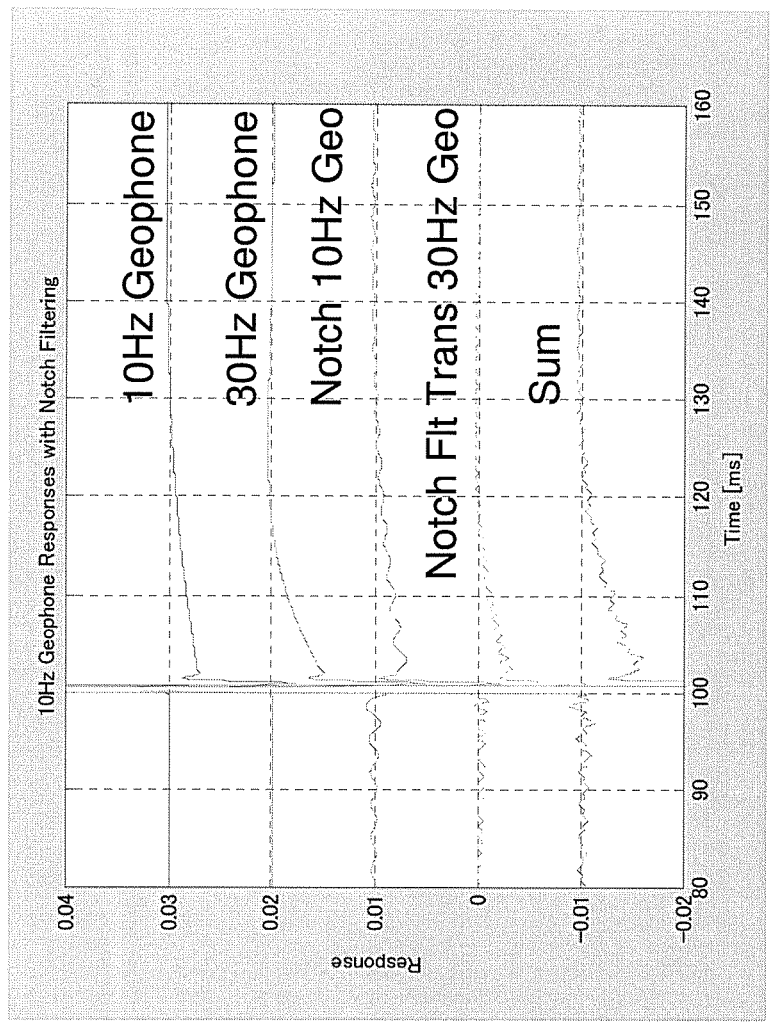
FIG. 5E shows impulse responses of a 10 Hz geophone, 30 Hz geophone, notched 10 Hz geophone, notched 30 Hz geophone after transformation and high pass filter (HPF) were applied.

FIG. 5D shows a graphical representation of the amplitude spectra of the summed results of the response signals of a 10 Hz geophone and a 30 Hz geophone using an embodiment of the sensor system represented in FIG. 5C. FIG. 5E shows a graphical representation of the impulse responses of (respectively from the top down) a 10 Hz geophone, 30 Hz geophone, notched 10 Hz geophone, and notched 30 Hz geophone after a HPF and transformation were applied. Because of the zero phase HPF filter, the notched 30 Hz geophone signal shows some precursor before the first motion. The amplitude of the summed geophones is slightly increased at about 15 Hz. This is the result of the phase compensation. The 30 Hz geophone signal is not summed below 10 Hz so as to not add noise.

The transfer function from Geophone 2, i.e., the 30 Hz geophone, to Geophone 1, i.e., the 10 Hz geophone, is:

$$T_2 = \frac{T_{g1}}{T_{g2}} \cdot T_{HPF} \cdot T_{n2} \quad \text{Equation 11}$$

where $T_{HPF}$ is the transfer function of the zero phase 20 Hz HPF. If it is desirable to apply amplitude and phase compensation so as to match the final response to a 10 Hz geophone, and to retain the amplitude, the transfer function for compensating amplitude and phase may be obtained as:

$$T_c = \frac{T_{g1}}{T_{g1} \cdot T_{n1} + \frac{T_{g1}}{T_{g2}} \cdot T_{HPF} \cdot T_{n2}} \quad \text{Equation 12}$$

Figure 5F:
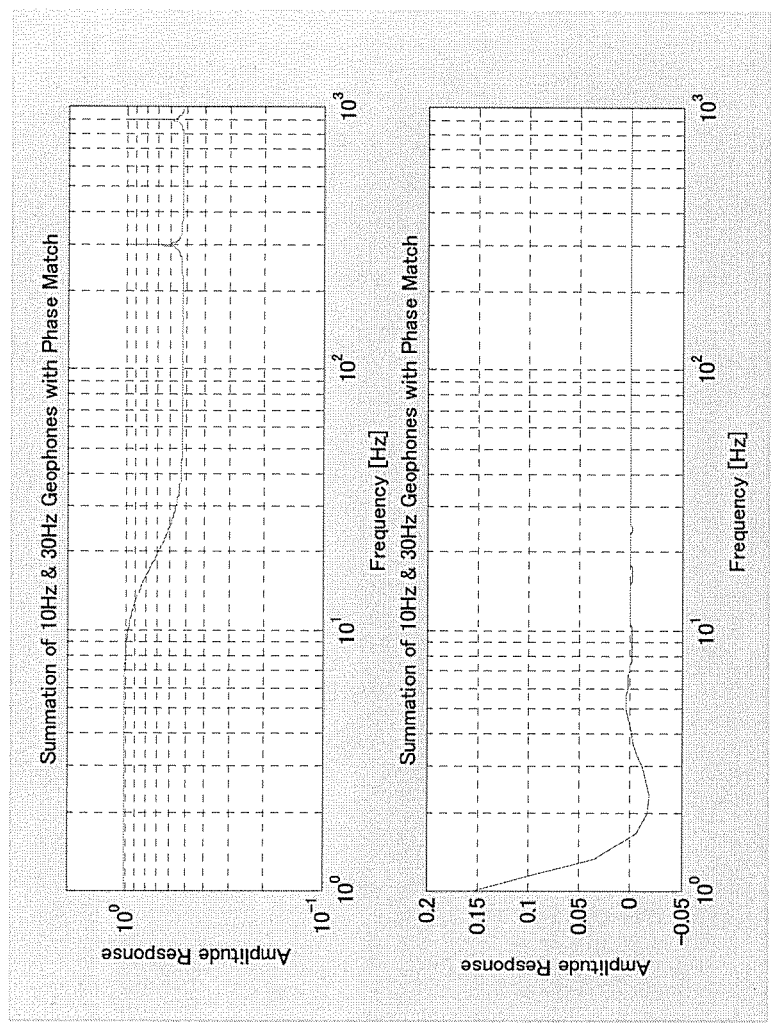
FIG. 5F shows the amplitude and phase responses of one embodiment of a compensation filter according to the present disclosure.
Figure 5G:
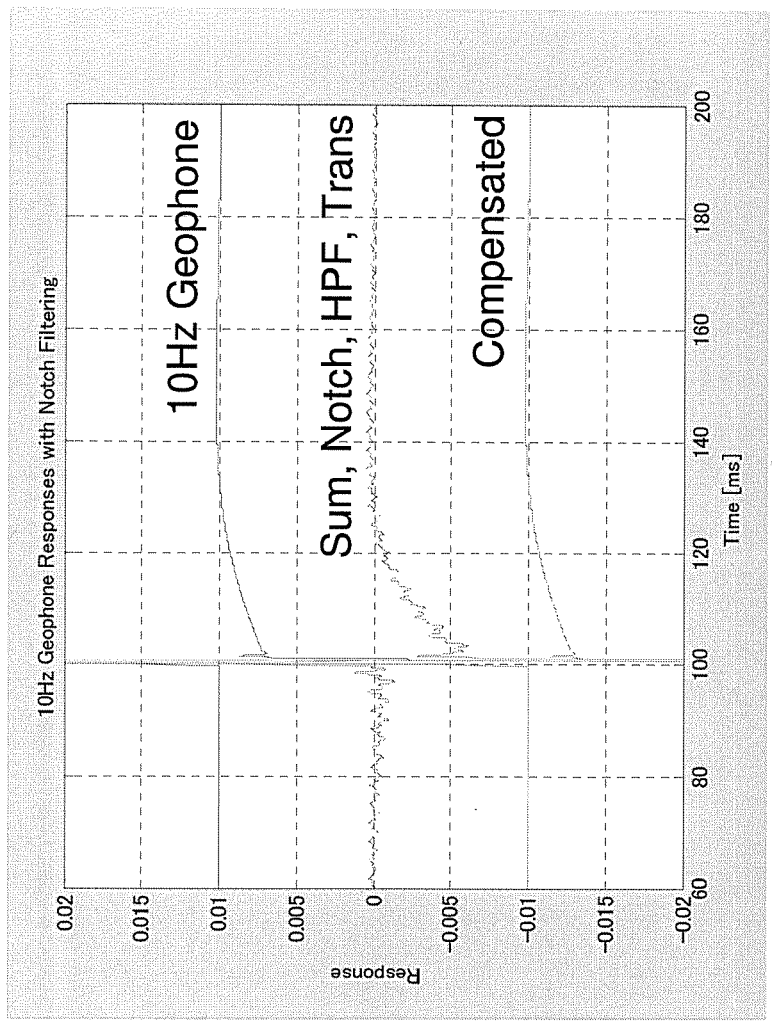
FIG. 5G shows an original 10 Hz impulse response, a summed response, and a compensated to a 10 Hz geophone response.

The compensation filter defined by Equation 12 is graphically shown in FIG. 5F. The compensation filter may be applied to the summed signals by using Equation 10. FIG. 5G shows an original 10 Hz impulse response at the top, summed response in the middle and compensated to 10 Hz geophone response at the bottom. The precursor due to the zero phase HPF was removed by the compensation filter.

Figure 6A:
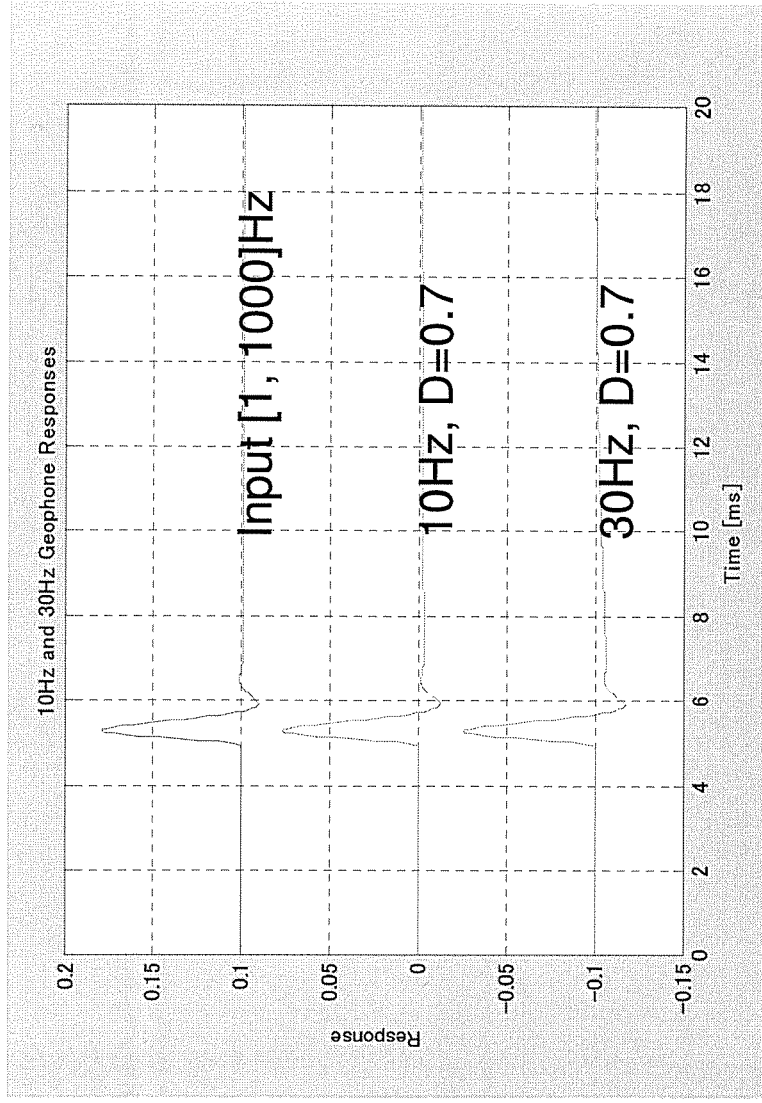
FIG. 6A depicts an input seismic waveform, the seismic waveform detected with a 10 Hz geophone, and the seismic waveform detected with a 30 Hz geophone.
Figure 6B:
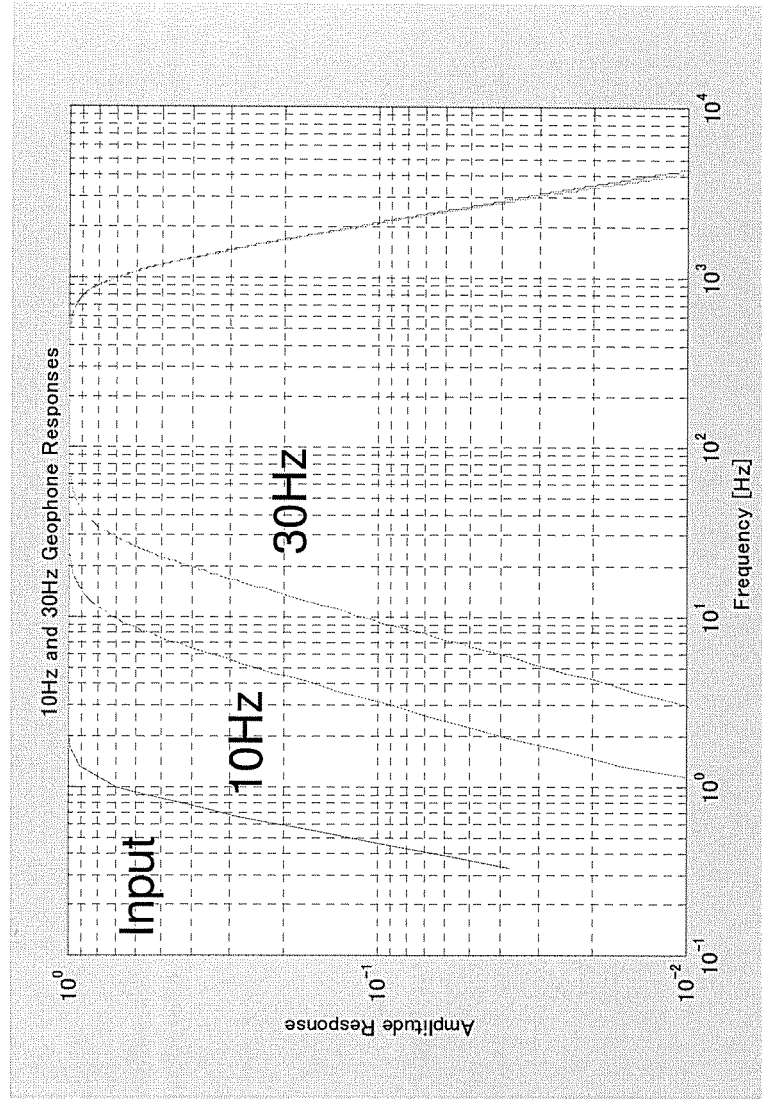
FIG. 6B shows the amplitude spectra for the input wave, the 10 Hz geophone waveform and the 30 Hz geophone waveform depicted in FIG. 6A.

Applicant also designed embodiments of a network combination of two geophones based on some of the principles discussed herein. Assuming a 10 Hz geophone seismic sensor and a 30 Hz geophone seismic sensor, a simulation was made using an input wave with 1 Hz to 1000 Hz. The input wave, the detected wave with the 10 Hz geophone and the detected wave with the 30 Hz geophone are graphically shown in FIG. 6A. The damping factors are assumed to be 0.7 for both geophones. FIG. 6B shows the amplitude spectra for the input wave, the 10 Hz geophone and the 30 Hz geophone. The outputs from the 10 Hz geophone and the 30 Hz geophone were combined using a network similar to the 2-way system described hereinafter.

Figure 6C:
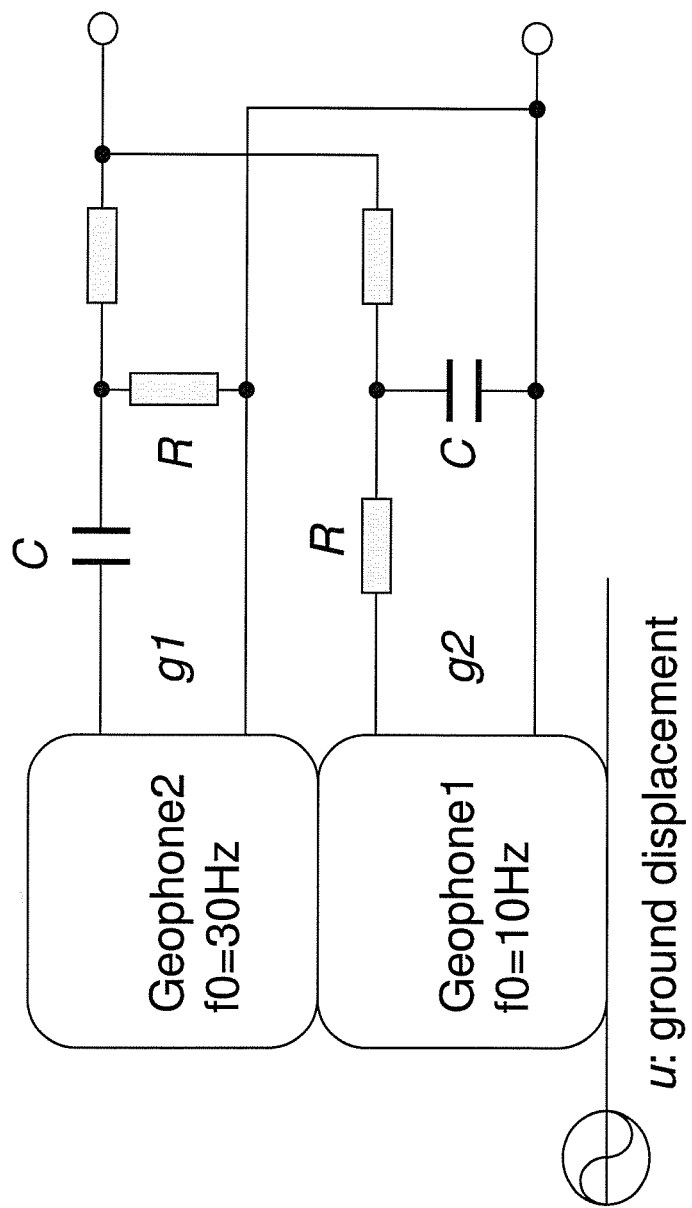
FIG. 6C is one exemplary representation of a geophone network combining two geophones according to at least some aspects of the present disclosure.
Figure 6D:
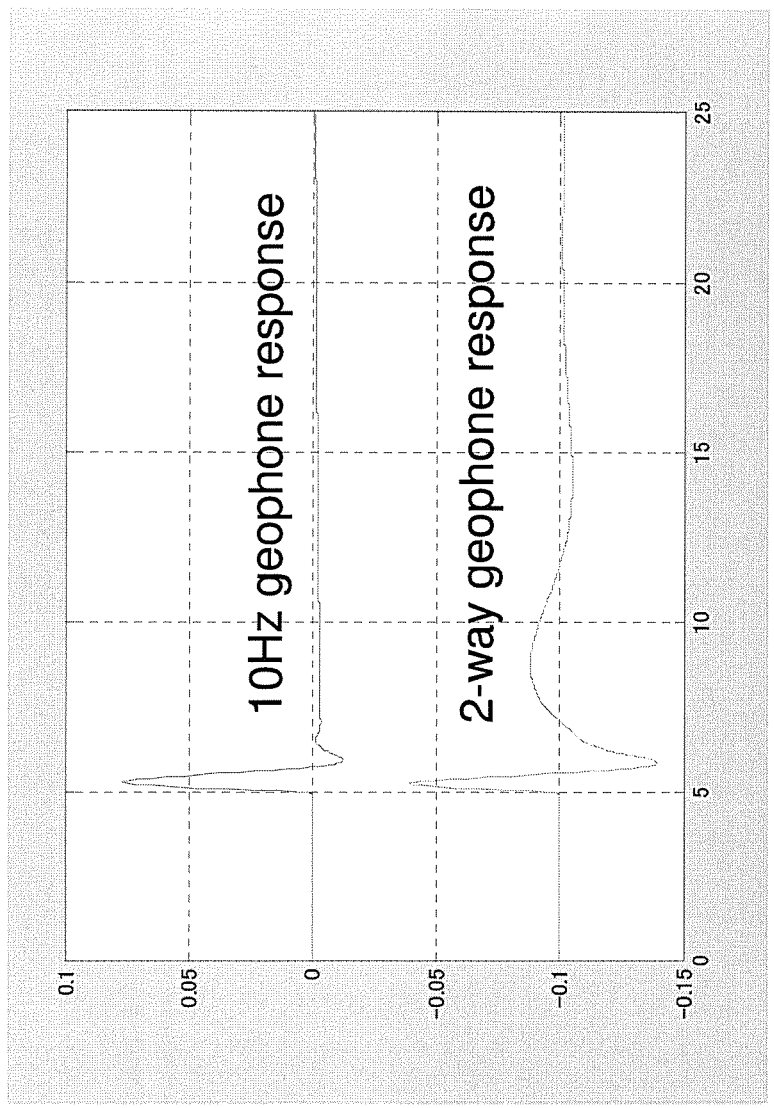
FIG. 6D depicts one exemplary combined seismic waveform according to some embodiments of the present disclosure.

FIG. 6C shows an example of an embodiment of a network circuit configured to combine the response signals of two geophones. FIG. 6D graphically shows an example of the combined waveform. The cross-over frequency is 100 Hz and $3^{rd}$ order Butterworth filters are used to combine the two geophones. The shape of the combined geophone response is quite different from that of the 10 Hz geophone, as the amplitude spectra shows in FIG. 6D. Applicant has recognized that there is an over response at the crossover frequency as a consequence of the difference in phase responses between the 10 Hz and the 30 Hz geophones in the two-way network system. The signals output by the 30 Hz geophone are transformed to the responses of the 10 Hz geophone so that the phase responses are matched. After phase compensation, the outputs of the 10 Hz geophone and the 30 Hz geophone are combined using the network system so that a wide frequency response is obtained without spurious response frequencies.

Figure 6E:
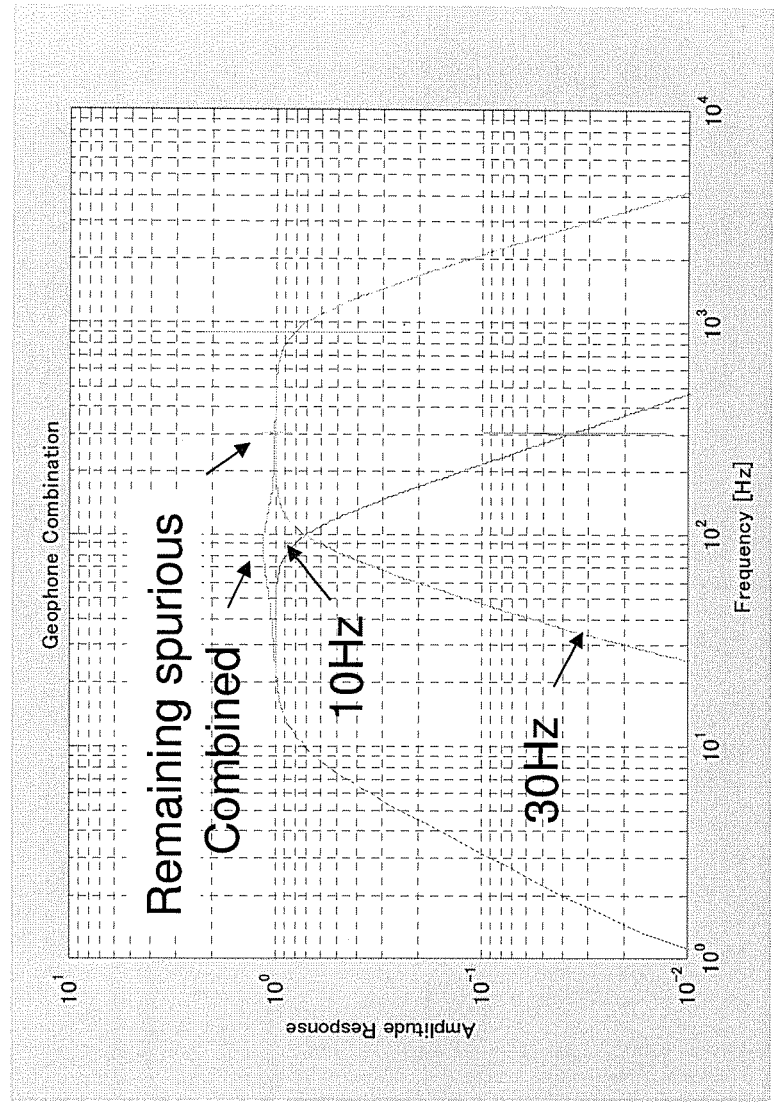
FIG. 6E shows the exemplary combined amplitude response from the network system shown in FIG. 6D with the two geophone responses according to some embodiments of the present disclosure.
Figure 6F:
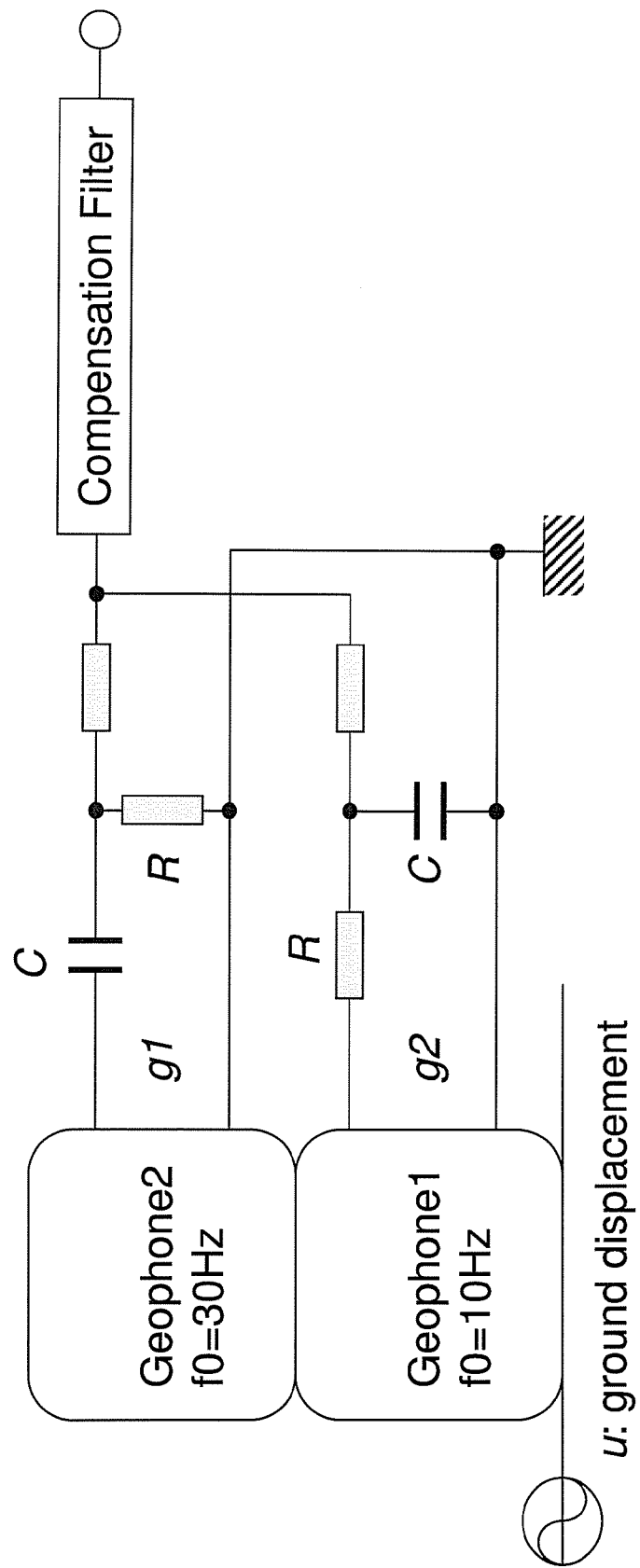
FIG. 6F is another exemplary representation of a geophone network combining two geophones and having a compensation filter according to some aspects of the present disclosure.

FIG. 6E graphically shows the amount of the spurious response suppression or cancellation in the illustrative embodiment. In this case, the suppression is about 1/10. It should be noted that by lowering the cross-over frequency and by using higher order filters the spurious responses may be further reduced. However, by using the proposed embodiment of the 2-way network system the high frequency spurious response is untouched. In order to retain the same waveform, a compensation filter similar to Equation 12 is needed, as illustrated in the representative embodiment of a schematic shown in FIG. 6F. For this compensation, the notch filter transfer functions $T_{n1}$ and $T_{n2}$ in Equation 12 should be replaced with $T_{f1}$ of the $3^{rd}$ order Butterworth low-pass-filter (LPF) and $T_{f1}$ of the $3^{rd}$ order Butterworth HPF.

Figure 6G:
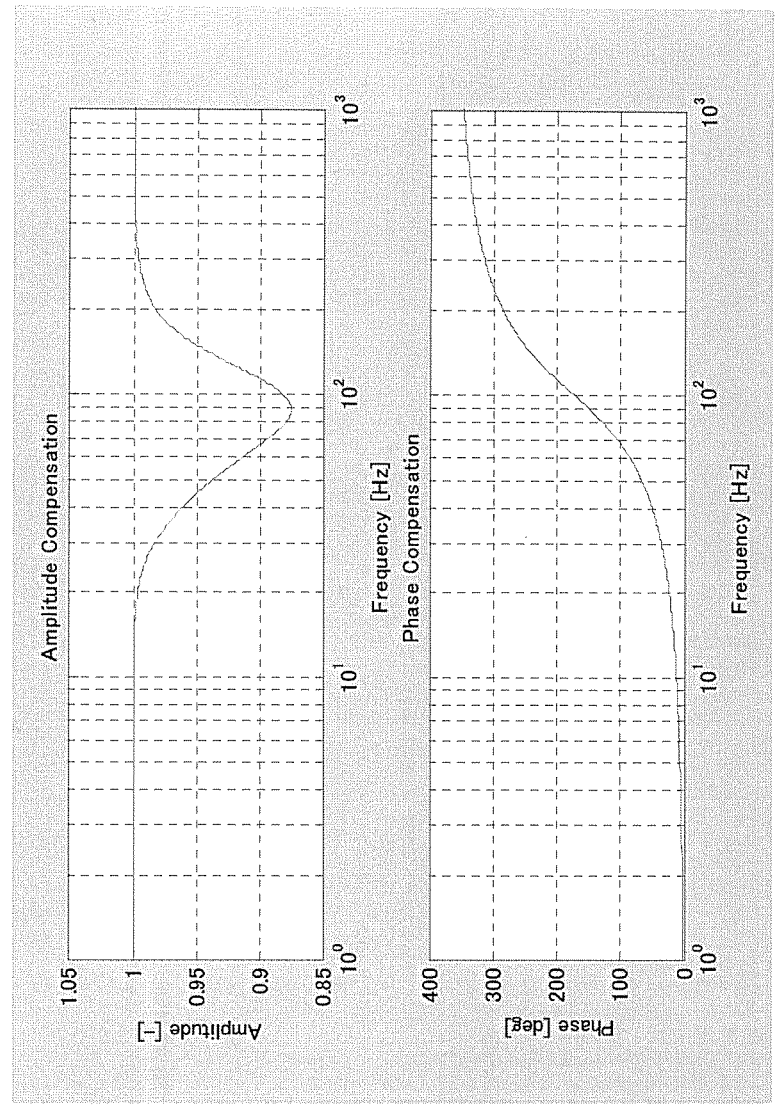
FIG. 6G depicts frequency responses of exemplary amplitude and phase compensation described in FIG. 6F according to some embodiments of the present disclosure.
Figure 6H:
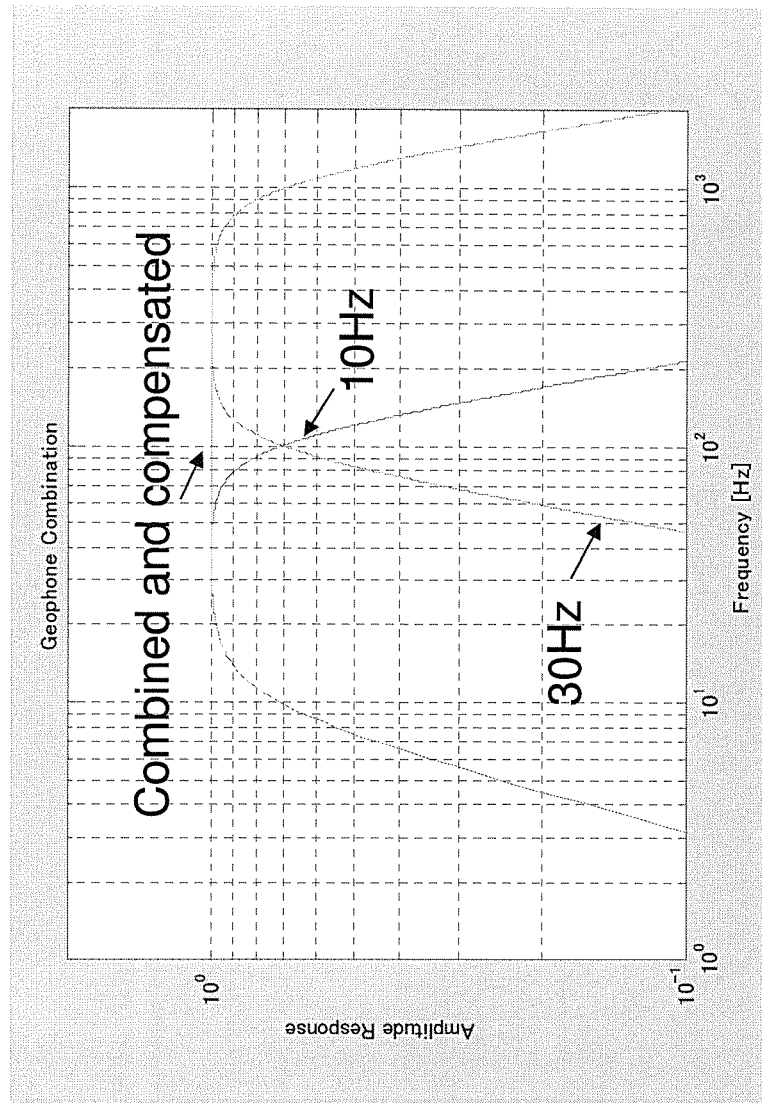
FIG. 6H shows combined and compensated geophone response signals generated by an embodiment of the seismic sensor network system shown in FIG. 6F according to some aspects of the present disclosure.

The simulated results in this example of the transfer function defined by modified Equation 12 are shown in FIG. 6G. As previously discussed, the compensation may be applied in digital signal processing using modified Equation 12. The amplitude response of this exemplary compensation is shown in FIG. 6H.

Figure 7A:
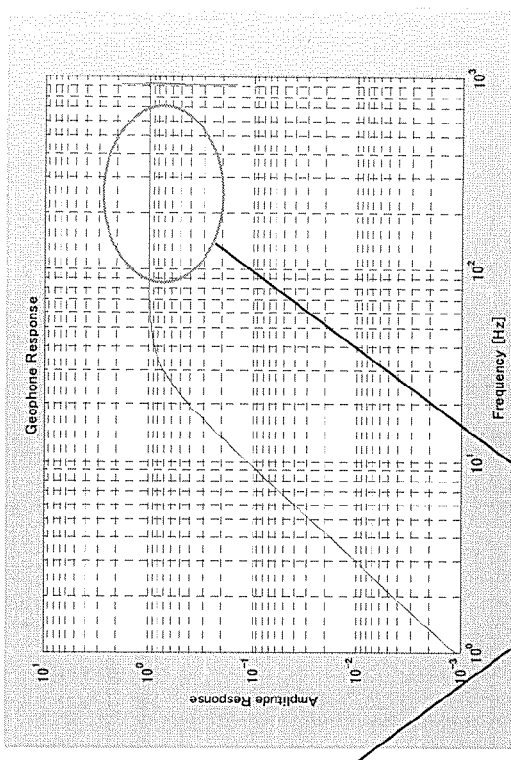
FIG. 7A shows the concept of an embodiment of a seismic sensor system as the exemplary system combines the response signals of a 10 Hz geophone and a 30 Hz geophone to suppress the spurious response signals at 600 Hz and at 900 Hz, according to some aspects of the present disclosure.
Figure 7A:
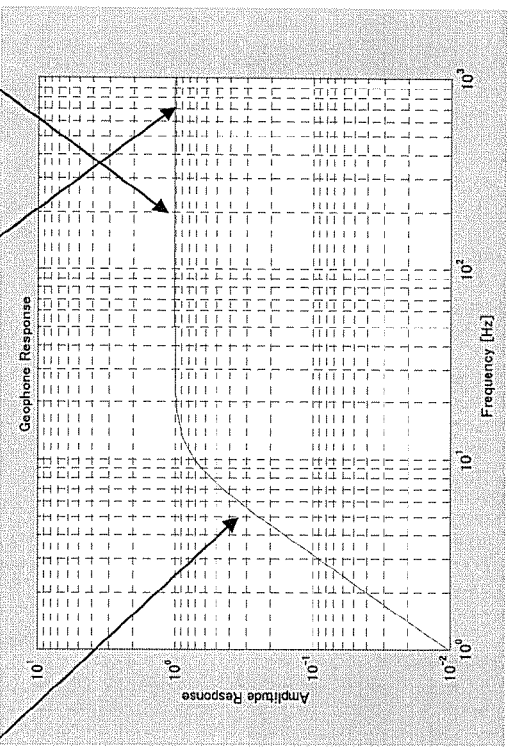
Figure 7A:
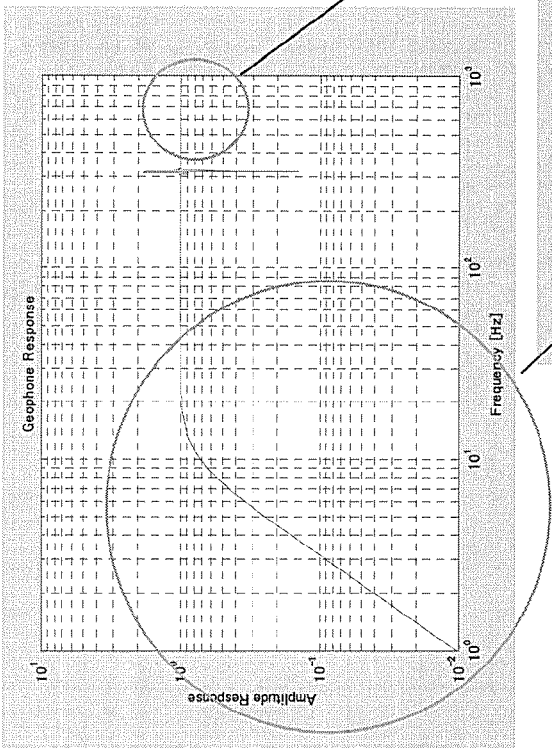
Figure 7B:
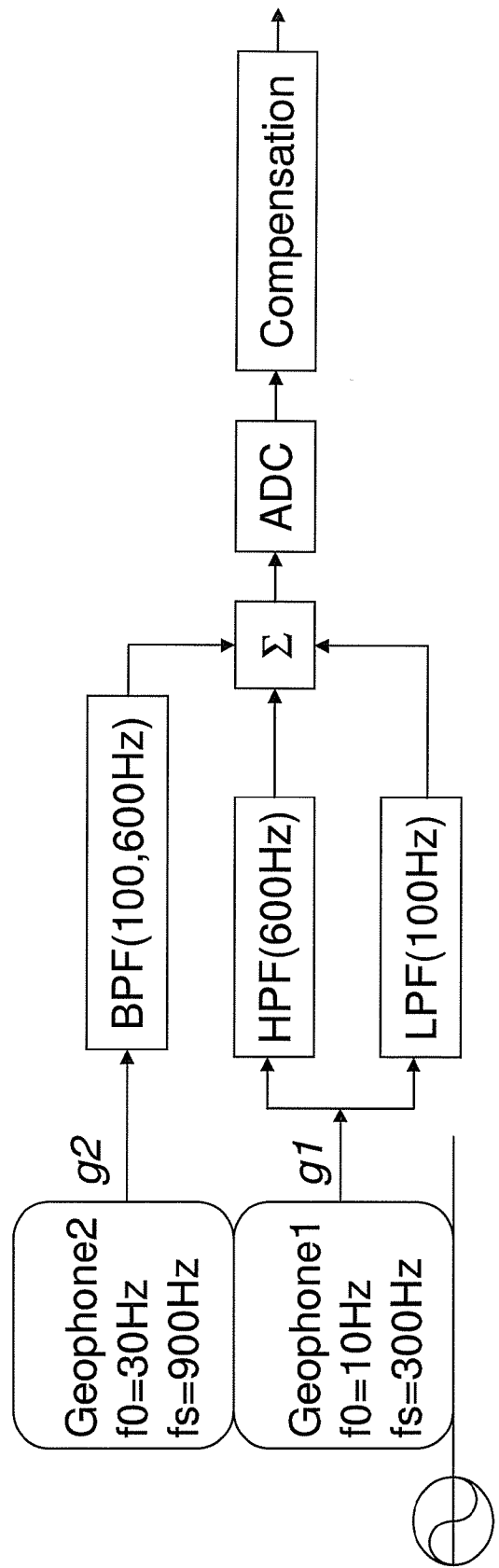
FIG. 7B is an exemplary block diagram representation of an embodiment of a geophone network system configured to extract spurious free bands from Geophone 1 and Geophone 2 to implement the concept shown in FIG. 7A by using a low pass filter, a high pass filter, and a band pass filter according to some aspects of the present disclosure.

In addition to the 2-way network described above, applicant has designed an embodiment of a 3-way combination technique for spurious response cancellation. In an illustrative embodiment, 30 Hz geophone signals are used to replace spurious response of 10 Hz geophone at approximately 300 Hz, as shown in FIG. 7A. FIG. 7B illustrates a schematic representation of an exemplary embodiment of geophone network system for extracting spurious free bands from Geophone 1 and Geophone 2 by using a LPF, a HPF and a BPF.

Figure 7C:
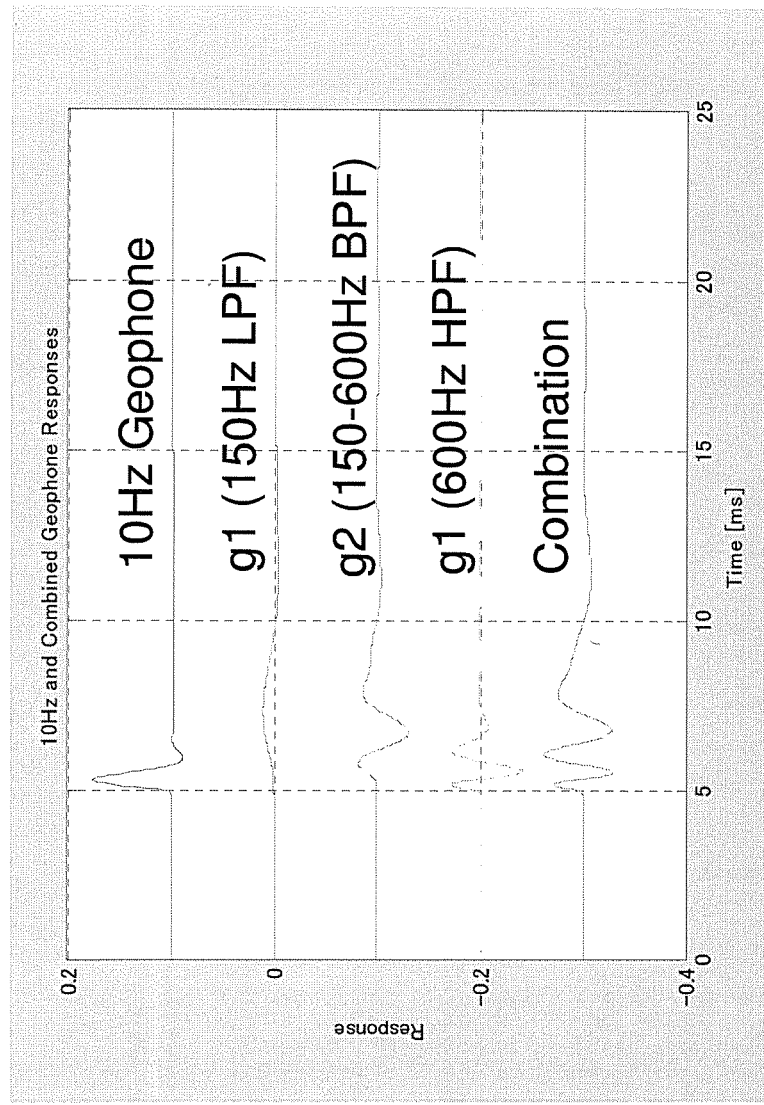
FIG. 7C shows an original seismic waveform from a 10 Hz geophone (at top), and waveform components of the outputs of low pass, high pass, and band pass filter filters, and the combined waveforms (at bottom) shown in FIG. 7B, according to some embodiments of the present disclosure.

The summed signal is converted to digital, and phase compensation is executed digitally, as previously described above. It should be noted that two geophone signals can also be digitized and the filters can be applied digitally. In this case, two analog-to-digital converters may be provided, but filter circuits can be replaced with digital signal processing. FIG. 7C graphically shows the waveforms of the input signal, components of the outputs of the filters, and the waveform after combination. As seen in FIG. 7C, the combined output is different than the input signal.

Figure 7D:
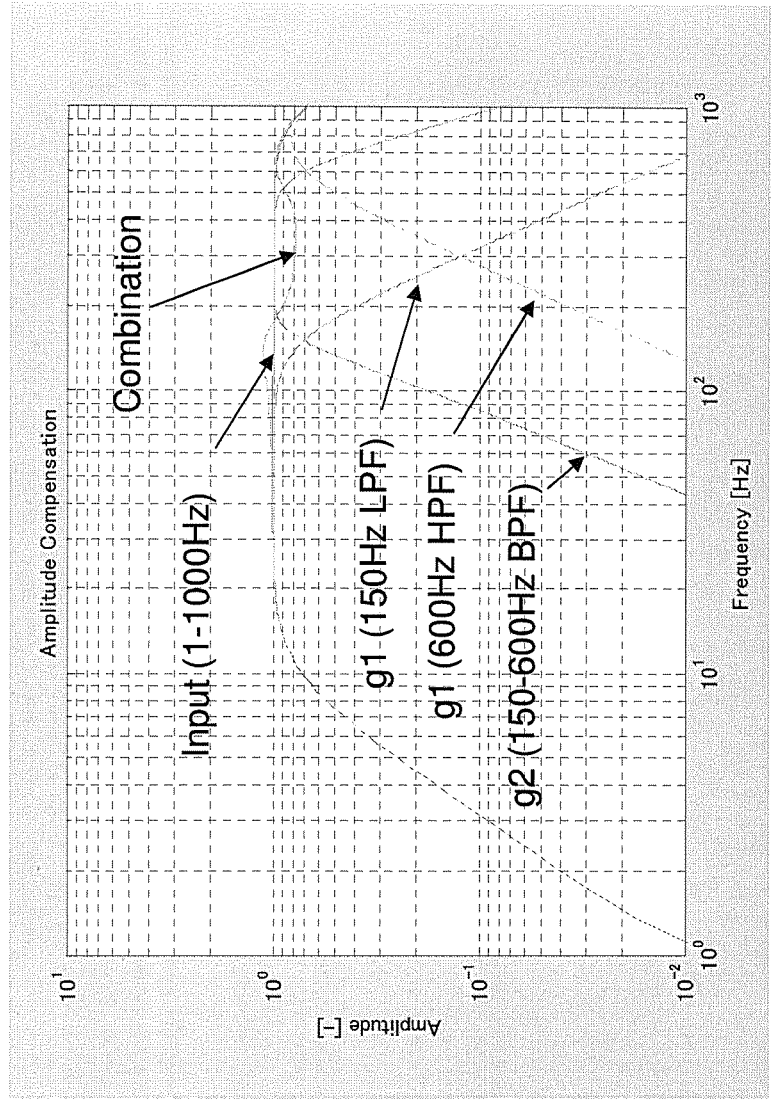
FIG. 7D shows a graphical representation of the amplitude spectra of a 10 Hz geophone, components of the filter outputs, and the combined seismic waveform shown in FIG. 7C according to some aspects of the present disclosure.

FIG. 7D graphically shows the amplitude spectra of the 10 Hz geophone, the components of filter outputs, and the waveform after combination. To compensate for phase rotation, a compensation filter may be designed based on Equation 13 below, where $T_{f1}$ is the transfer function of a 150 Hz LPF, $T_{f2}$ is that of a 150 Hz to 600 Hz BPF and $T_{f3}$ is that of a 600 Hz HPF.

$$T_c = \frac{T_{g1}}{T_{g1} \cdot T_{f1} + T_{g2} \cdot T_{f2} + T_{g1} \cdot T_{f3}} \quad \text{Equation 13}$$

Figure 7E:
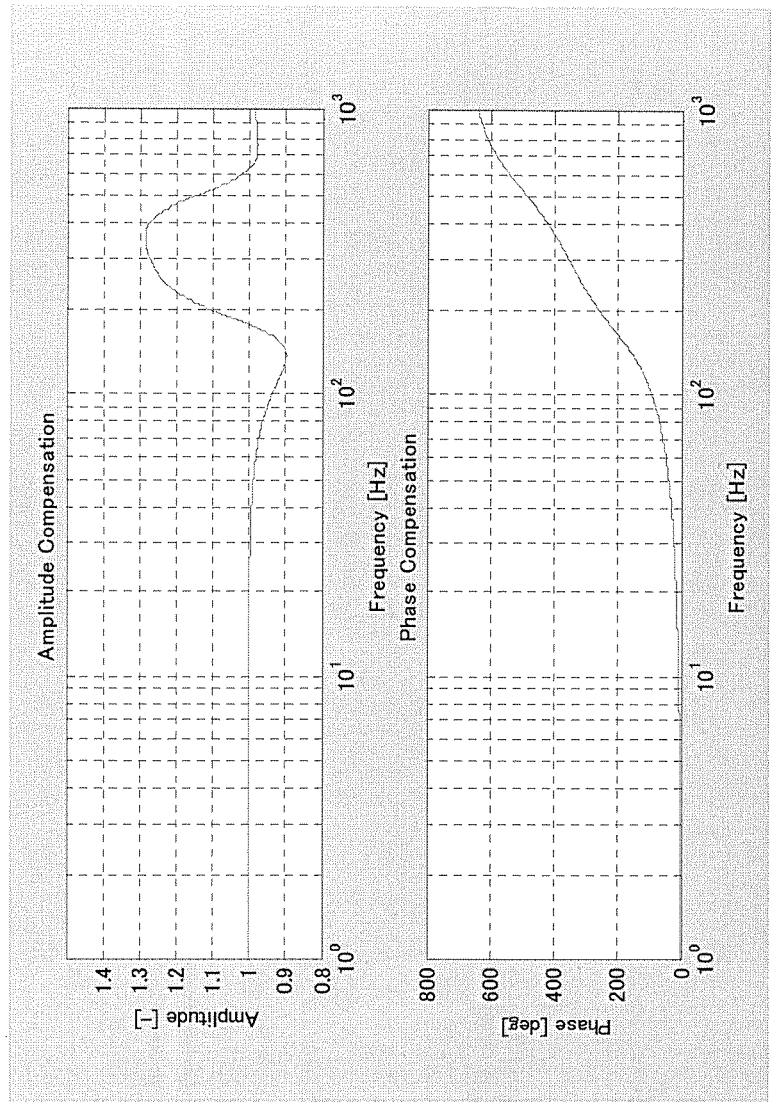
FIG. 7E depicts modeled results of amplitude and phase compensation using a compensation filter to transform the combined signal of FIG. 7D to that of a 10 Hz geophone according to some embodiments of the present disclosure.

FIG. 7E graphically shows the modeled results of the applied compensation filter to transform the combined signal to that of the 10 Hz geophone and is shown as Equation 13.

Applicant has further designed an embodiment of a geophone network system for spurious response cancellation that improves the SNR of the summed geophone response signals. As described above, by combining parts of the geophone responses of multiple geophones, it is possible to reduce the spurious responses. However, in certain instances a network system to combine two geophones causes changes in the amplitude and phase responses. This is because the phases of the two geophones at the cross-over frequency are not the same. The change in amplitude and phase responses may be large when combining three different frequency ranges because the network responses at one cross-over frequency cause phase rotation at the other cross-over frequency. It has been demonstrated that response compensation can be performed digitally after the signal data is digitized. Since there are multiple geophones, it is possible to sum the signals, except for the spurious responses, to improve the SNR.

Figure 8:
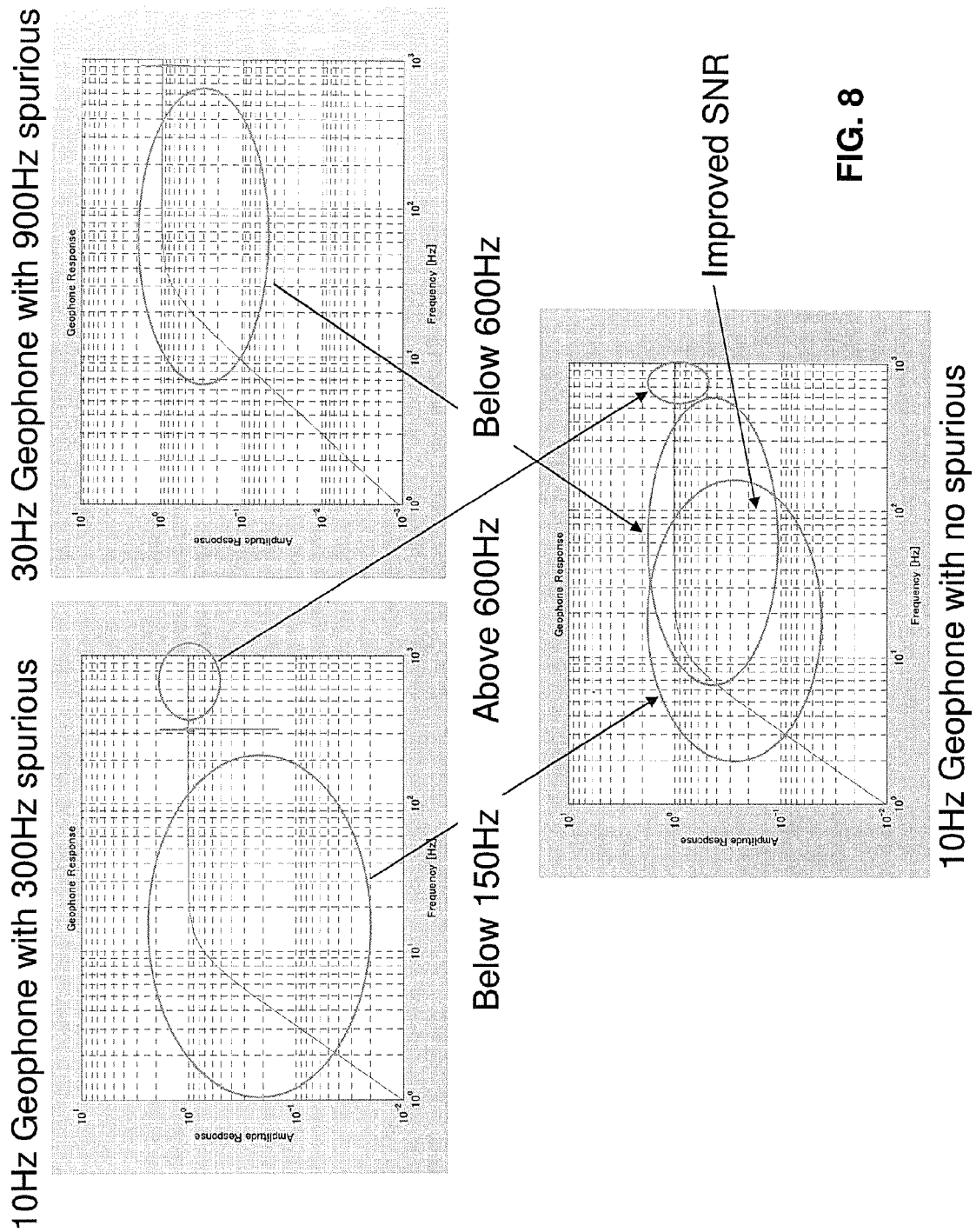
FIG. 8 shows a conceptual view of an exemplary combination of the response signals of a 10 Hz geophone, a 30 Hz geophone, and the combined response signals using an embodiment of the seismic sensor system according to some aspects of the present disclosure.

FIG. 8 graphically shows responses of a 10 Hz geophone sensor and a 30 Hz geophone sensor, and the summed response. It has been assumed that both geophones have the same sensitivity. By summing the two geophones, the amplitude is doubled at the frequencies above the natural frequencies. However, if the noise level is the same for each geophone, the noise level only increases by a factor of $\sqrt{2}$.

Since two geophones are used in this illustrative embodiment, it is possible to sum the signals from both geophones without spurious responses. By summing the outputs of the two geophones, the combined output signal is doubled and the SNR improved. It is noted that the 30 Hz geophone sensor does not have significant signals of interest below 30 Hz. Therefore, adding signals below 30 Hz would probably just add noise. FIG. 8 illustrates a representation of the concept for such a combination of geophone response signals.

FIG. 9A shows one exemplary implementation of an embodiment of a geophone network for spurious response cancellation by summation as illustrated in FIG. 8. The low frequency part of the 30 Hz geophone signal is removed by a filter so as to not add noise. In this implementation, both of the response signals of the 10 Hz geophone and the 30 Hz geophone are digitized and the filters are applied digitally. The advantages of digital filtering lie in that the parameters are exact and are not temperature dependent. All the filters are $3^{rd}$ order Butterworth. In this configuration, it was found that the BPFs cause significant phase rotation and the summed amplitude is large if the polarity is reversed.

FIG. 9B graphically shows the impulse responses at each filter output. In this case, the combined geophone waveform shows a large phase shift. FIG. 9C graphically shows the frequency spectra of the impulse responses represented in FIG. 9B. FIG. 9D shows the modeled results of a compensation filter used to transform the combined signal to that of the 10 Hz geophone using:

$$T_c = \frac{T_{g1}}{T_{g1} \cdot T_{f1} - T_{g2} \cdot T_{f2} + T_{g3} \cdot T_{f3}} \qquad \text{Equation 14}$$

FIG. 10 depicts in a flowchart an embodiment of a method for cancelling spurious geophone response signals in seismic signals sensed by a geophone seismic sensor in accordance with the present disclosure. In a method illustrate by FIG. 10, one or more seismic sensor is deployed (200) for acquisition of seismic data. Seismic signals are detected (202) using the one or more seismic sensor and spurious response signals are cancelled (204) based on predetermined location of the spurious response signals. The waveforms are compensated for resulting artifacts caused by filtering (206) and modified seismic waveforms are output (208) having extended frequency bandwidth.

It is important to note that geophone response parameters, such as natural frequency, open circuit damping and open circuit sensitivity change in changing temperature. In addition, since the DC resistance changes, the total damping factor changes. To design the compensation filter, there is a need to use the geophone response parameters related to the working conditions when the seismic signal is captured.

It is ideal if the geophones are calibrated in situ each time when the seismic signal is captured (as seen in the leftmost spur of the flowchart shown in FIG. 10). The second option is to monitor the geophone temperatures and estimate the response parameters according to the measured temperature of the geophones (as seen in the spur of the flowchart between the leftmost spur and the main branch of FIG. 10). These techniques are more fully explained in U.S. Pat. No. 7,225,662B2, "Geophone Calibration Techniques" by the applicant and commonly assigned, the contents of which are hereby fully incorporated for all purposes.

Generally, the techniques disclosed herein may be implemented on software and/or hardware. For example, they can be implemented in an operating system kernel, in a separate user process, in a library package bound into network applications, on a specially constructed machine, or on a network interface card. In one embodiment, the techniques disclosed herein may be implemented in software such as an operating system or in an application running on an operating system.

A software or software/hardware hybrid implementation of the present techniques may be implemented on a general-purpose programmable machine selectively activated or reconfigured by a computer program stored in memory. Such a programmable machine may be implemented on a general-purpose network host machine such as a personal computer or workstation. Further, the techniques disclosed herein may be at least partially implemented on a card (e.g., an interface card) for a network device or a general-purpose computing device.

The embodiments and aspects were chosen and described in order to best explain the principles of the invention and its practical applications. The preceding description is intended to enable others skilled in the art to best utilize the principles described herein in various embodiments and with various modifications as are suited to the particular use contemplated. It is intended that the scope of the invention be defined by the following claims.

What is claimed is:

1. A method of seismic surveying, the method comprising:
deploying at least a first and a second seismic sensors at a location for seismic signal detection, wherein the two sensors have different bandwidth and each has a different natural frequency;
acquiring seismic signals with the at least two seismic sensors, the seismic signals comprising response signals having frequency spectra of low and high frequencies, wherein at high frequencies, the response signals include sensor dependent spurious response signals whose frequencies are at least 20 times the natural frequencies;
applying spurious response cancellation based on the high frequency locations of the spurious response signals, wherein the spurious response cancellation comprises summing the seismic signals acquired by the first seismic sensor and the second seismic sensor with crossover based on the two different bandwidths; and
generating modified seismic waveforms having extended frequency bandwidth wherein the extended bandwidth is above the lowest spurious frequency.

2. The method of seismic surveying according to claim 1, wherein the spurious response cancellation comprises applying notch filtering based on the high frequency location of the spurious response signals.

3. The method of seismic surveying according to claim 1, further comprising:
applying a compensation filter to compensate for a resulting artifact produced by phase and amplitude shift in the summed seismic signals.

4. The method of seismic surveying according to claim 3, wherein the compensation filter is applied after analog to digital conversion of the summed seismic signals.

5. The method of seismic surveying according to claim 1, further comprising:
deploying a first seismic sensor and a second seismic sensor at a location for seismic signal detection; and
acquiring seismic signals with the first seismic sensor and the second seismic sensor,
wherein the spurious response cancellation comprises:
filtering the seismic signals acquired by the first seismic sensor and the second seismic sensor to extract selected portions of the acquired seismic signals based on the high frequency location of the spurious response signals, and
summing the extracted seismic signals of the first seismic sensor and the second seismic sensor.

6. The method of seismic surveying according to claim 5, further comprising:
applying analog to digital conversion of the summed seismic signals; and
applying a compensation filter to compensate for a resulting artifact produced by phase and amplitude shift in the summed seismic signals.

7. The method of seismic surveying according to claim 1, further comprising:
deploying the first seismic sensor and the second seismic sensor at a location for seismic signal detection;
acquiring seismic signals with the first seismic sensor and the second seismic sensor;
applying analog to digital conversion of the acquired seismic signals,
wherein the spurious response cancellation comprises:
filtering the digitized seismic signals acquired by the first seismic sensor and the second seismic sensor to extract selected portions of the acquired seismic signals based on the high frequency location of the spurious response signals, and summing the extracted seismic signals of the first seismic sensor and the second seismic sensor, wherein the summed seismic signals of the first seismic sensor and the second seismic sensor overlap at a bandwidth; and applying a compensation filter to compensate for a resulting artifact produced by phase and amplitude shift in the summed seismic signals.

8. The method of seismic surveying according to claim 7, wherein the first seismic sensor has a first natural frequency and the second seismic sensor has a second natural frequency and the first natural frequency is lower than the second natural frequency, and wherein filtering the digitized seismic signals acquired by the first seismic sensor and the second seismic sensor comprising:

rejecting signals from the second seismic sensor below the second natural frequency; and rejecting signals from the first seismic sensor in the range of the spurious response of the first seismic sensor.

9. The method of seismic surveying according to claim 1, further comprising:

deploying a first seismic sensor and a second seismic sensor at a location for seismic signal detection; and acquiring seismic signals with the first seismic sensor and the second seismic sensor, wherein the first seismic sensor comprises a 10 Hz geophone seismic sensor and the second seismic sensor comprises a 30 Hz geophone seismic sensor and wherein the spurious frequencies are about 300 Hz or greater.

10. The method of seismic surveying according to claim 1, wherein the seismic sensor is configured or designed for downhole use in a borehole.

11. The method of seismic surveying according to claim 1, wherein the seismic surveying comprises permanent or semi-permanent installation of the seismic sensor in seismic signal detection.

12. The method of seismic surveying according to claim 1, wherein the seismic surveying comprises hydraulic fracture mapping.

13. The method of seismic surveying according to claim 1, wherein the seismic surveying comprises cross-well tomography.

14. The method of seismic surveying according to claim 1, wherein the seismic surveying comprises shallow VSP.

15. A method of processing seismic waveform data, comprising:

acquiring seismic signal with at least a first and a second seismic sensors, wherein the two sensors have different bandwidths and natural frequencies, each comprising a housing; at least one detecting system within the housing structured and arranged so as to be fixed in a radial direction relative to the housing and movable in an axial direction thereof, the acquired seismic signals comprising response signals having frequency spectra of low and high frequencies, wherein at high frequencies, the response signals include sensor dependent spurious response signals whose frequencies are at least 20 times the natural frequencies;

applying spurious response cancellation based on the high frequency location of the spurious response signals; and generating modified seismic waveforms having extended frequency bandwidth which combines the bandwidths of the first and the second sensors wherein the extended bandwidth is above the lowest spurious frequency.

16. A method for cancellation of spurious response signals in seismic waveform data acquired using a first seismic sensor and a second seismic sensor, wherein the two sensors have different bandwidths and each has a different natural frequency, the method comprising:

acquiring seismic signals with the first seismic sensor and the second seismic sensor, the seismic signals comprising response signals having frequency spectra of low and high frequencies, wherein at high frequencies, the response signals include sensor dependent spurious response signals having identifiable bandwidth location which is at least 20 times the natural frequencies;

applying notch filtering to the seismic signals acquired with the first seismic sensor and the second seismic sensor based on the location of the spurious response signals;

summing the notched seismic signals of the first seismic sensor and the second seismic sensor; and generating modified seismic waveforms based on the summed seismic signals of the first seismic sensor and the second seismic sensor, the modified seismic waveforms having extended frequency bandwidth wherein the extended bandwidth is above the lowest spurious frequency.

17. A seismic sensor system, comprising:

at least a first geophone and a second geophone electrically connected in a network to output combined signals in response to seismic signals, wherein the first geophone has a first natural geophone frequency that is lower than a second natural geophone frequency of the second geophone, wherein each geophone has a response signal having frequency spectra of low and high frequencies, wherein at high frequencies, the response signal include a sensor dependent spurious response whose frequencies are at least 20 times the natural frequencies, wherein the first spurious response of the first geophone has a frequency that is lower than a second spurious response of the second geophone, and wherein the first geophone and the second geophone are placed at same location and wherein the combined bandwidth is above the lowest spurious frequency.

18. A system for use in seismic signal detection, comprising:

at least a first seismic sensor and a second seismic sensor, wherein the first seismic sensor has a first natural frequency that is lower than a second natural frequency of the second seismic sensor, each seismic sensor comprising:

a housing;

at least one magnet for creating a magnetic field mounted within the housing;

a moving coil within the housing structured and arranged so as to be fixed in a radial direction relative to the housing and movable in an axial direction thereof; and an electrical circuit configured or designed for combining low frequency signals from the first seismic sensor and high frequency signals from the second seismic sensor so that sensor dependent spurious frequency signals are reduced in the combined signals wherein the spurious frequencies are at least 20 times the natural frequencies and wherein the combined bandwidth is above the lowest spurious frequency.

\* \* \* \* \*